(12) United States Patent
Nakata et al.

(10) Patent No.: US 6,809,916 B2
(45) Date of Patent: Oct. 26, 2004

(54) SHOCK ABSORBING MEMBER CAPABLE OF ABSORBING LARGER IMPACT APPLIED TO ELECTRONIC APPARATUS

(75) Inventors: Katsuhiko Nakata, Kawasaki (JP); Tadanobu Matsumura, Kawasaki (JP); Shinichirou Kouno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 575 days.

(21) Appl. No.: 09/772,071

(22) Filed: Jan. 30, 2001

(65) Prior Publication Data

US 2002/0043608 A1 Apr. 18, 2002

(30) Foreign Application Priority Data

Jun. 1, 2000 (JP) ........................................ 2000-164462

(51) Int. Cl.[7] .............................................. H02H 47/00
(52) U.S. Cl. ...................................... 361/115; 361/683
(58) Field of Search ................................ 361/115, 683, 361/681, 685

(56) References Cited

U.S. PATENT DOCUMENTS

| | | | |
|---|---|---|---|
| 3,791,133 A | * 2/1974 | Hashimura et al. ......... | 368/278 |
| 3,855,053 A | * 12/1974 | Fuss ........................... | 428/340 |
| 3,952,980 A | * 4/1976 | Von Pragenau et al. .... | 248/636 |
| 4,914,722 A | * 4/1990 | Holden et al. .............. | 310/345 |
| 5,071,009 A | * 12/1991 | Ridgeway ................... | 206/586 |
| 5,568,357 A | * 10/1996 | Kochis et al. .............. | 361/681 |
| 6,186,330 B1 | * 2/2001 | Yoshimura .................. | 206/594 |

FOREIGN PATENT DOCUMENTS

| | | |
|---|---|---|
| JP | 52-91684 | 8/1977 |
| JP | 52-152193 | 12/1977 |
| JP | 54-124996 | 9/1979 |
| JP | 7-110726 | 4/1995 |
| JP | 7-220149 | 8/1995 |
| JP | 8-37382 | 2/1996 |
| JP | 8-65868 | 3/1996 |
| JP | 10-222972 | 8/1998 |
| JP | 10-230798 | 9/1998 |
| JP | 10-241350 | 9/1998 |

OTHER PUBLICATIONS

Patent Abstract of Japan, Publication No. 10–322039, dated Dec. 4, 1998.
Patent Abstract of Japan, Publication No. 7–266444, dated Oct. 17, 1995.
Patent Abstract of Japan, Publication No. 7–168647, dated Jul. 4, 1995.
Japan Utility Model Appln. No. 6–18973, dated Mar. 11, 1994.

* cited by examiner

*Primary Examiner*—Stephen W. Jackson
(74) *Attorney, Agent, or Firm*—Westerman, Hattori, Daniels & Adrian, LLP

(57) ABSTRACT

A shock absorbing body is interposed between an internal component such as a hard disk drive (HDD) and the inside surface of an enclosure for an electronic apparatus such as a notebook personal computer. The shock absorbing body includes a first receiving surface defined at one end of the shock absorbing body so as to receive the internal component. A second receiving surface is defined at the other end of the shock absorbing body so as to receive the inside surface of the enclosure. A constriction is formed in the shock absorbing body between the first and second receiving surfaces. When a larger impact is applied to the enclosure, the shock absorbing body is allowed to suffer from a fracture at the constriction. The energy of the impact is transformed into the energy of the fracture at the constriction. The impact energy is sufficiently consumed in this manner. The internal component can be protected from the larger impact.

29 Claims, 34 Drawing Sheets

SHOCK ABSORBING MEMBER CAPABLE OF ABSORBING LARGER IMPACT APPLIED TO ELECTRONIC APPARATUS

BACKGROUND OF THE INVENTION

1. Field of the Invention

The present invention relates to an electronic apparatus designed to incorporate an internal component such as a hard disk drive (HDD), a liquid crystal display (LCD) unit, or the like, for example. In particular, the invention relates to a shock absorbing member designed to protect the internal component from a larger impact acting on the enclosure of the electronic apparatus.

2. Description of the Prior Art

A shock absorbing or damping material such as a resin foam is in general inserted between the enclosure of an electronic apparatus such as a personal computer and an internal component such as a hard disk drive (HDD) housed in the enclosure. When an impact is applied to the enclosure of the electronic apparatus, the elastic deformation of the shock absorbing material contributes to a full consumption of the energy induced by the impact. The internal component is thus protected from the vibration or sway resulting from the impact. The suppression of the vibration or sway contributes to avoidance of a breakage or malfunction of the internal component. The internal component is supposed to surely keep operating without any trouble.

An increased mobility of the electronic apparatus is supposed to lead to an increased opportunity of suffering from larger impact. The electronic apparatus may often be dropped to the ground or the like from a higher elevation. In this case, the aforementioned shock absorbing material fails to totally consume the energy of the impact, so that the internal component is easily forced to collide against the enclosure. The internal component is supposed to suffer from a larger impact energy. Such a larger impact energy may induce a damage, a breakage or a malfunction of the internal component.

SUMMARY OF THE INVENTION

It is accordingly an object of the present invention to provide a shock absorbing member, to be disposed between an electronic apparatus and an internal component incorporated therein, capable of sufficiently absorbing a larger impact as compared with a conventional shock absorbing member made of an elastic material.

According to a first aspect of the present invention, there is provided an electronic apparatus comprising: an enclosure; an internal component housed in the enclosure; and a shock absorbing member disposed between the internal component and the enclosure and designed to plastically deform in response to an impact.

When the electronic apparatus is dropped to the ground, for example, a larger impact is applied to the enclosure of the electronic apparatus. The shock absorbing member is allowed to plastically deform in response to the impact. The energy of the impact is transformed into the energy of the plastic deformation. Specifically, the impact energy can sufficiently be consumed in the shock absorbing member. Less impact is transmitted to the internal component from the enclosure of the electronic apparatus. The internal component is thus sufficiently protected from a larger impact. The inventors have proved that the shock absorbing member of this type surely establishes a higher performance of absorbing a larger impact as compared with a conventional shock absorbing member of an elastic material. The plastic deformation in this manner may include a crash or fracture of the shock absorbing member.

When the internal component is guaranteed against the impact of a predetermined magnitude, for example, the shock absorbing member may establish a strength enough to suffer from a plastic deformation in response to an impact exceeding the predetermined magnitude. In this case, it is preferable to establish the strength of the enclosure at a level higher than the strength of the shock absorbing member.

For example, the electronic apparatus may includes a shock absorbing member comprising: a shock absorbing body designed to plastically deform in response to an impact of a predetermined magnitude; a first receiving surface defined at an end of the shock absorbing body so as to receive the internal component; and a second receiving surface defined at the other end of the shock absorbing body so as to receive an impact applied from an outside.

Here, the shock absorbing body may include: a first terminal portion defining the first receiving surface; a second terminal portion defining the second receiving surface; and a constriction connecting the first and second terminal portions to each other, for example. The shock absorbing body of this type is expected to stably receive the internal component and the enclosure at the first and second receiving surfaces of a broader area, respectively. Simultaneously, the strength can be reduced at the constriction in the shock absorbing body. The concentration of stress is thus induced at the constriction when an impact is applied to the shock absorbing body. The shock absorbing body is allowed to easily suffer from a plastic deformation or fracture at the constriction. Moreover, the constriction designed to extend along a datum line intersecting the first receiving surface by a predetermined angle contributes to a reliable fracture of the constriction even when an impact is applied to the first receiving surface in a direction normal to the first receiving surface.

According to a second aspect of the present invention, there is provided an enclosure for an electronic apparatus, comprising an enclosure body defining: a rigid area designed to plastically deform in response to an impact of a first magnitude; and a shock absorbing area designed to plastically deform in response to an impact of a second magnitude smaller than the first magnitude.

When the shock absorbing area receives an impact of the second magnitude or a predetermined magnitude, the shock absorbing area is forced to plastically deform without inducing a plastic deformation of the rigid area. The impact energy is thus transformed into the energy of the plastic deformation at the shock absorbing area. The impact energy can sufficiently be consumed in the shock absorbing area. In the case where an internal component is incorporated within the enclosure, for example, the internal component can be protected from a larger impact. The plastic deformation may include a fracture or destruction of the enclosure body. In this case, a pedestal may be attached to the shock absorbing area. The pedestal is expected to increase the probability of inducing the first collision of the shock absorbing area as compared with the rigid area.

According to a third aspect of the present invention, there is provided a shock absorbing member comprising: a first elastic member attached to a corner of the enclosure and having the rigidity of a first level; and a second elastic member covering over the exterior surface of the first elastic member and having the rigidity of a second level smaller than the first level.

The shock absorbing member serves to sufficiently absorb a relatively small impact at the second elastic member before it reaches the enclosure of the electronic apparatus. The enclosure of the electronic apparatus is prevented from receiving the small impact. Any internal component incorporated within the enclosure can thus be protected from the small impact. When a relatively large impact is applied to the shock absorbing member, the elastic deformation of the second elastic member reaches its upper limit or threshold. The impact is transmitted to the first elastic member. The large impact is this time sufficiently absorbed at the first elastic member. The enclosure is thus prevented from receiving the large impact. A combination of the first and second elastic members serves to establish a higher performance of absorbing an impact over a broader range of magnitude as compared with the case where the first and second elastic members are separately employed. Moreover, the thickness of the shock absorbing member can be reduced as compared with the case where the second elastic member is solely employed to achieve the same performance.

According to a fourth aspect of the present invention, there is provided a shock absorbing member for an internal component incorporated in an electronic apparatus, comprising: an attachment member coupled to an enclosure of the electronic apparatus; and a contact piece rising from the attachment member so as to receive the internal component, wherein a bending portion is defined in the contact piece at least between the enclosure of the electronic apparatus and the internal component.

The shock absorbing member enables establishment of a sufficient elasticity in the contact piece at the bending portion. When a larger impact is applied to the enclosure of the electronic apparatus upon drop of the electronic apparatus from a higher elevation, the bending portion is easily allowed to elastically deform in response to the impact, so that the impact can be transformed into the energy of an elastic deformation. The impact energy can thus sufficiently be consumed at the contact piece. The internal component is reliably protected from the larger impact.

The shock absorbing member may include at least a pair of the contact pieces so as to interpose an occupation space for the internal component therebetween. When the internal component is held between the contact pieces, it is possible to support the internal component without interposition of any other components or members. The impact is reliably allowed to act on the internal component only via the contact pieces.

The contact piece may be made from a metallic material such as aluminum, copper, and the like. Otherwise, the contact piece may be made by molding from a hard plastic material expected to establish the rigidity equivalent to that of the metallic material. The contact piece should have the rigidity at least enough to maintain its original shape by itself. It is preferable that the contact piece is allowed to establish the rigidity enough to absorb a larger impact by a smaller displacement stroke or amplitude.

According to a fifth aspect of the present invention, there is provided a shock absorbing member for an internal component incorporated in an electronic apparatus, comprising: an attachment member coupled to an enclosure of the electronic apparatus; and an elastic piece integral to the attachment member and designed to receive the internal component.

In general, an attachment member or frame is employed to support the internal component in the enclosure of the electronic apparatus. The attachment member is expected to have the rigidity considerably higher than that of a shock absorbing member of an elastic material such as a resin foam. The unitary arrangement of the elastic piece and the attachment member serves to establish the rigidity of the elastic piece enough to absorb a larger impact by a relatively smaller displacement stroke or amplitude. The unitary body comprising the attachment member and the elastic piece may be made from a metallic material such as aluminum, copper, or the like, or made by molding from a hard plastic material expected to establish the rigidity equivalent to that of the metallic material. The elastic piece may include a bending portion which reliably establishes a sufficient elastic deformation.

According to a sixth aspect of the present invention, there is provided a shock absorbing member for an internal component incorporated in an electronic apparatus, comprising: a connecting member stationarily supported in an inner space defined in an enclosure of the electronic device for receiving the internal component; and a suspended member connected to the connecting member and suspended in a direction of gravity in the inner space.

When the internal component is set in the suspended member, the internal component can be suspended in the direction of gravity within the inner space of the enclosure. The internal component is thus supported in a floating manner within the inner space. When a larger impact is applied to the enclosure from the below upon drop of the electronic apparatus to the ground or else from a higher elevation, for example, the impact is transmitted to the internal component only via the connecting member located upward. The impact should follow a longer path to reach the internal component. The longer path of the transmission allows the impact to attenuate during the transmission. The internal component can thus sufficiently be protected from the impact in this manner.

The suspended member may be constructed as a spherical pendulum. The suspended member of this type allows the internal component to swing, so that the energy of the impact can be transformed into the kinetic energy. The consumption of the impact energy can be promoted. The internal component is thus still reliably protected from a larger impact.

According to a seventh aspect of the present invention, there is provided a shock absorbing member for an internal component incorporated in an electronic apparatus, comprising: an attachment member attached to an enclosure of the electronic apparatus; and at least a pair of swelling surfaces raised from a surface of the attachment member, respectively, so as to interpose an occupation space for the internal component therebetween.

When the internal component is held between the swelling surfaces in the electronic apparatus, for example, the internal component can be supported in a floating manner between the swelling surfaces. The internal component is still allowed to move in the direction tangential to the respective swelling surfaces. Specifically, the movement of the internal component is restricted within a plane. If a larger impact is applied to the enclosure upon drop of the electronic apparatus onto the ground or else from a higher elevation, for example, the internal component is allowed to move along the plane. The energy of the impact is transformed into the kinetic energy. The impact energy is thus sufficiently consumed. The internal component is prevented from receiving a larger impact. The internal component can sufficiently be protected from a larger impact.

According to an eighth aspect of the present invention, there is provided an electronic apparatus comprising: an enclosure; an internal component housed in the enclosure; a protrusion attached to one of the enclosure and the internal component; a receiving member attached to other of the enclosure and the internal component so as to define a void opposed to the protrusion; and a tensioned elastic member extending across a space between the protrusion and the void.

The elastic member is allowed to stretch as the protrusion advances into the void in the electronic apparatus. The elastic member gets elongated. The stretch of the elastic member serves to transform the impact energy into the energy of an elastic deformation. The impact energy can sufficiently be consumed in the elastic member. Accordingly, the internal component is sufficiently protected from a relatively small impact.

When the protrusion further advances into the void, the elastic member is tightly held between the protrusion and the inside surface of the void. A compressive deformation is then induced in the elastic member. The compressive deformation serves to realize a sufficient consumption of the impact energy. The internal component can thus be protected from a relatively large impact this time.

According to a ninth aspect of the present invention, there is provided an electronic apparatus comprising: an enclosure having corners on a bottom; and a reinforcing beam extending over the bottom so as to connect opposite corners.

In general, the enclosure of the electronic apparatus defines four side walls standing on the periphery of the rectangular bottom plate. Four edges or ridgelines are formed at the junction of the bottom plate and the side walls. The edges serve to reinforce the rigidity of the enclosure. The combination of the edges and the reinforcing beams achieves a still increased rigidity of the enclosure. Flexure such as the twist of the bottom plate can effectively be prevented.

According to a tenth aspect of the present invention, there is provided an electronic apparatus comprising: an enclosure; a display panel module housed in the enclosure; and a shock absorbing member fixed on an exterior of the enclosure behind the display panel module.

When the exterior surface of the enclosure suffers from a larger impact upon drop of the electronic apparatus to the ground or else from a higher elevation, for example, the shock absorbing member serves to sufficiently absorb the larger impact. The enclosure for the display panel module is thus prevented from receiving a larger impact. Any deformation such as flexure can sufficiently be suppressed in the enclosure. The display panel module is reliably protected from a larger impact.

BRIEF DESCRIPTION OF THE DRAWINGS

The above and other objects, features and advantages of the present invention will become apparent from the following description of the preferred embodiments in conjunction with the accompanying drawings, wherein:

FIG. 36 is a schematic view illustrating the action of the shock absorbing unit when a relatively small impact is applied to;

FIG. 37 is a schematic view illustrating the action of the shock absorbing unit when a relatively large impact is applied to;

FIG. 45 is a schematic view illustrating the action of the shock absorbing unit when a relatively small impact is applied to;

FIG. 46 is a schematic view illustrating the action of the shock absorbing unit when a relatively large impact is applied to;

DESCRIPTION OF THE PREFERRED EMBODIMENTS

Figure 1:
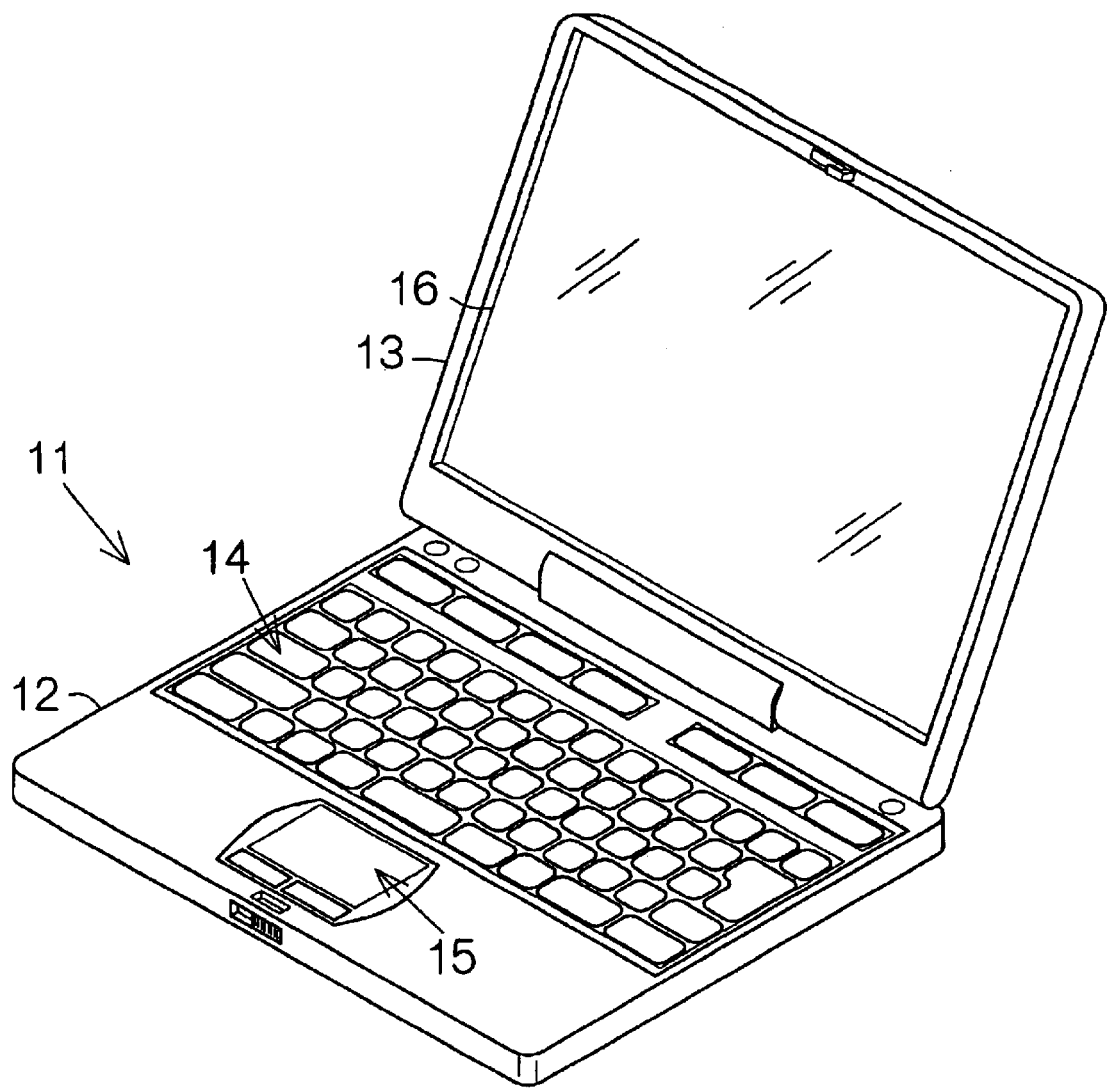
FIG. 1 is a perspective view illustrating a portable notebook personal computer as an electronic apparatus according to a first embodiment of the present invention.

FIG. 1 schematically illustrates a portable notebook personal computer 11 as an electronic apparatus according to a first embodiment of the present invention. The notebook personal computer 11 includes, for example, a main body 12 incorporating a motherboard, not shown, and a display panel unit 13 connected to the main body 12 for hinging or swinging movement relative to the main body 12. As conventionally known, a central processing unit (CPU) and a memory module are mounted on the motherboard, for example. The motherboard is designed to control an input device such as a keyboard 14 and a pointing device 15 so as to assist the processing of the CPU. A liquid crystal display (LCD) panel module 16 is incorporated within the display panel unit 13, for example. The result of the processing of the CPU can be displayed on the screen of the LCD panel module 16, for example.

Figure 2:
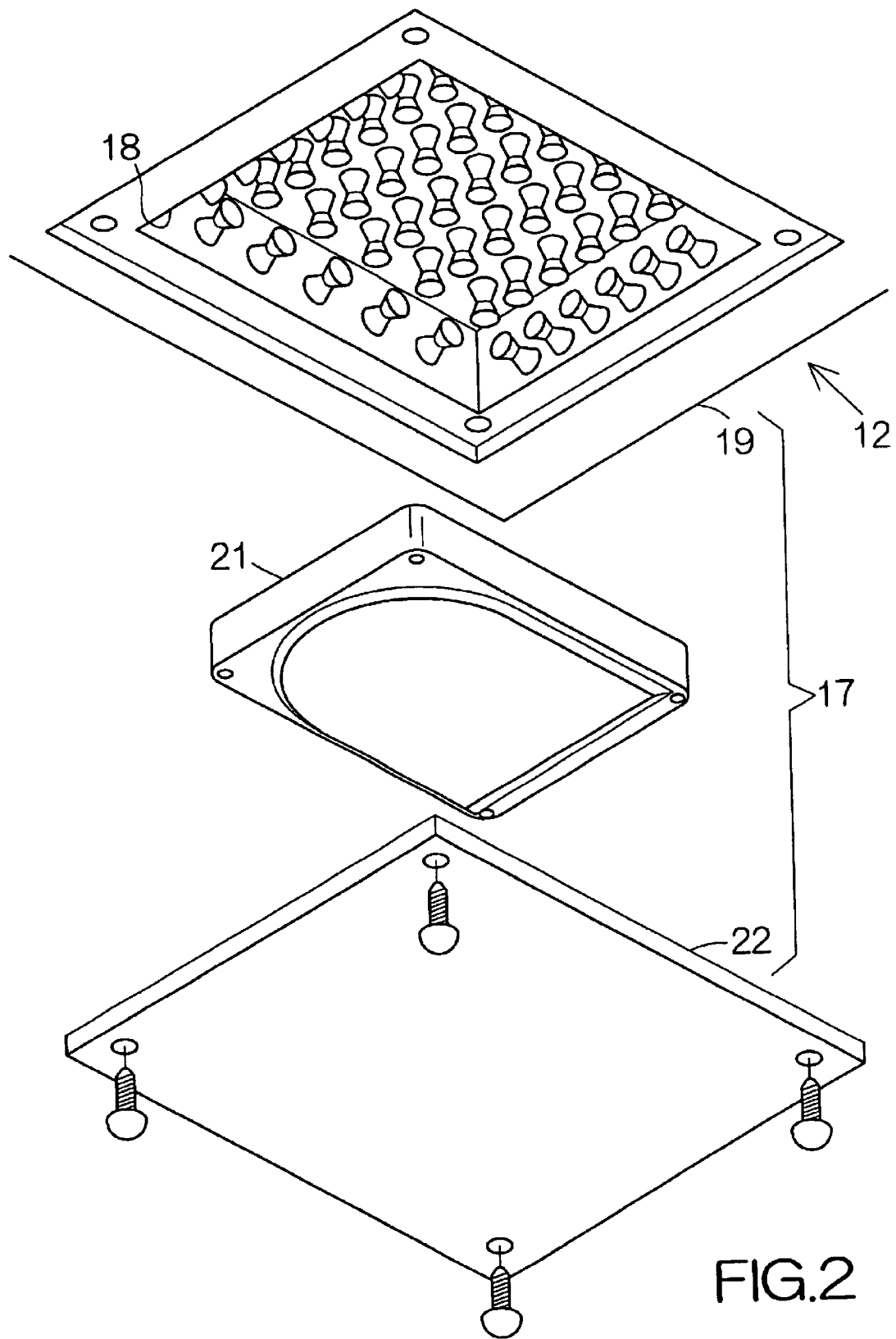
FIG. 2 is a perspective view partially illustrating the backside or bottom of a main body in the notebook personal computer.

As shown in FIG. 2, the main body 12 includes an enclosure 17 shaped in a flat rectangular parallelepiped. The enclosure 17 has an enclosure body 19 defining an inner space 18 inside. The inner space 18 is designed to open at the backside or bottom of the main body 12. When the main body 12 is placed on the desk or else, for example, for the manipulation of a user, the opening of the inner space 18 is set opposed to the top surface of the desk. The enclosure body 19 may be made by molding or else from a metallic material such as aluminum or magnesium, a plastic material such as a fiber reinforced plastic (FRP), or the like.

A hard disk drive (HDD) 21 as an internal component is incorporated within the enclosure 17. The HDD 21 is received within the inner space 18. When the HDD 21 is received in the inner space 18, the HDD 21 is allowed to oppose its exterior surface such as the upper and peripheral surfaces to the inner surface of the enclosure body 19.

The opening of the inner space 18 is closed with a cover 22. Screws may be employed to fix the cover 22 to the enclosure body 19, for example. When the cover 22 is attached to the enclosure body 19, the HDD 21 in the inner space 18 is allowed to oppose its exterior or bottom surface to the inside surface of the cover 22. The cover 22 may be made by molding or else from a metallic material such as aluminum or magnesium, a plastic material such as a fiber reinforced plastic (FRP), or the like.

Figure 3:
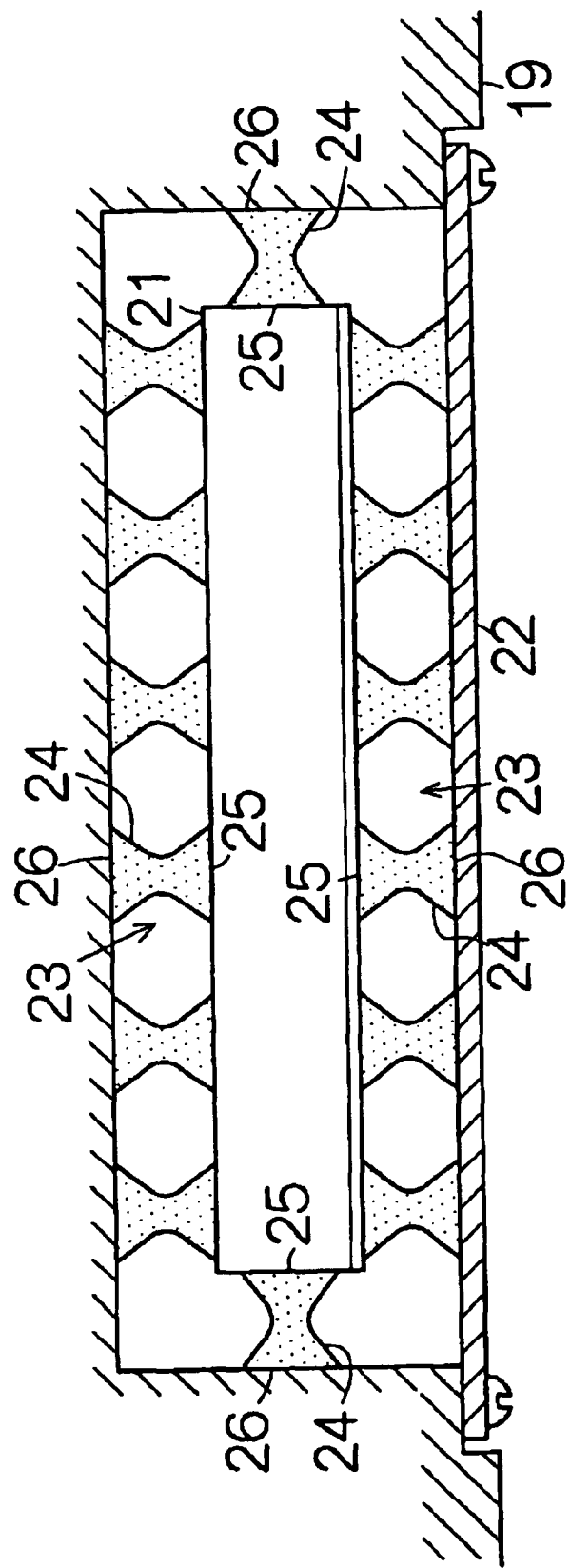
FIG. 3 is a sectional view schematically illustrating the structure of an inner space within the main body.

Referring also to FIG. 3, a shock absorbing member or mechanism 23 is disposed between the inner surface of the enclosure body 19 and the exterior surface such as the upper and peripheral surfaces of the HDD 21 as well as between the inside surface of the cover 22 and the exterior or bottom surface of the HDD 21. The shock absorbing member 23 includes shock absorbing bodies 24 designed to crash in response to an impact of a predetermined magnitude. The shock absorbing bodies 24 may be arranged at equally spaced positions on the respective surfaces of the HDD 21. In particular, the shock absorbing bodies 24 are arranged in a grid on the upper and bottom surfaces of the HDD 21, as partly shown in FIG. 2, for example.

An inward receiving surface 25 is defined at one end of the individual shock absorbing body 24 so as to receive the exterior surface of the HDD 21. An outward receiving surface 26 is also defined at the other end of the individual shock absorbing body 24 so as to extend in parallel with the inward receiving surface 25. The respective outward receiving surfaces 26 are received on the inner surface of the enclosure body 19 as well as the inside surface of the cover 22. The shock absorbing bodies 24 are fixedly adhered to the inner surface of the enclosure body 19 as well as the inside surface of the cover 22 at the respective outward receiving surfaces 26. An adhesive, a double sided adhesive tape, or the like may be employed to achieve such an adhesion.

Figure 4:
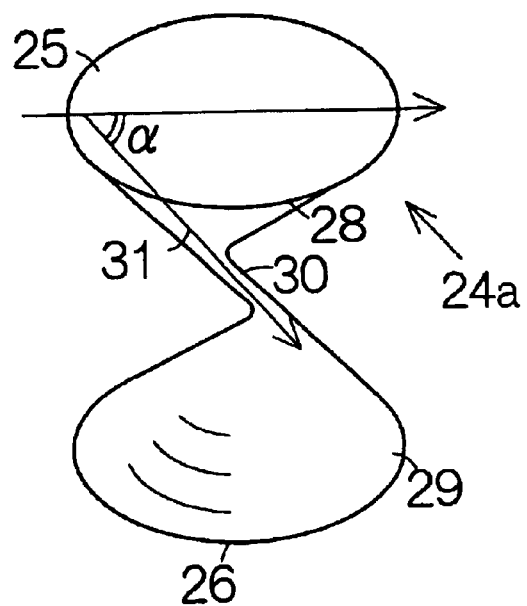
FIG. 4 is an enlarged perspective view schematically illustrating the structure of a unitary shock absorbing body according to a first specific example.

FIG. 4 illustrates a unitary shock absorbing body 24a according to a first specific example. The shock absorbing body 24a comprises an inside terminal body or portion 28 and an outside terminal body or portion 29. The inside terminal body 28 is shaped into a cone in the overturned attitude so as to define the inward receiving surface 25 over the upward round bottom surface. Likewise, the outside terminal body 29 is shaped into a cone in the normal attitude so as to define the outward receiving surface 26 over the downward round bottom surface. A constriction 30 as a slender stem portion is formed in the shock absorbing body 24a between the inside and outside terminal bodies 28, 29. The constriction 30 is designed to connect the apices of the inside and outside terminal bodies 28, 29 to each other. Moreover, the constriction 30 is allowed to extend along a datum line 31 intersecting at least the outward receiving surface 26 by a predetermined angle α. It should be noted that the inside and outside terminal bodies 28, 29 as well as the constriction 30 may have any shape other than the aforementioned ones. The shock absorbing body 24a of this type is expected to stably receive the enclosure 17 and the HDD 21 at the inward and outward receiving surfaces 25, 26 of a broader area. Additionally, the strength can be reduced at the constriction 30 in the shock absorbing body 24a. The unitary shock absorbing body 24a may be made by molding or else from a soft plastic material such as polyethylene plastic, a metallic material, or the like.

Figure 5:
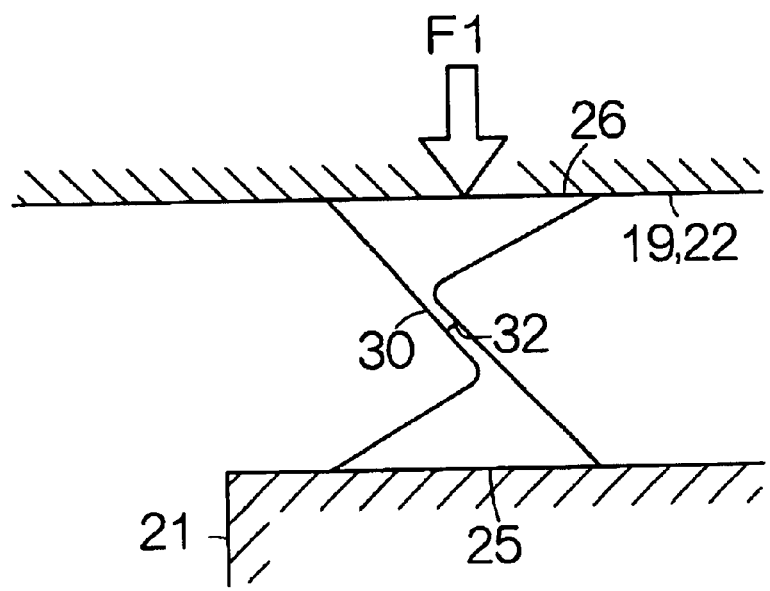
FIG. 5 is an enlarged side view schematically illustrating the shock absorbing body suffering from fracture in response to an impact.

Now, assume that a larger impact is applied to the enclosure 17 in response to drop of the notebook personal computer 11 to the ground or the like. As shown in FIG. 5, when the impact F1 is applied to the outward receiving surface 26 in the direction normal to the outward receiving surface 26, the shock absorbing body 24a is collapsed between the enclosure 17 and the HDD 21, for example. In this case, the concentration of stress is induced at the constriction 30 of a smaller sectional area in the shock absorbing body 24a. Moreover, since the longitudinal axis of the constriction 30 is designed to intersect the outward receiving surface 26 by the predetermined angle α, a larger shearing stress is caused at the constriction 30. The shearing stress easily serves to fracture the constriction 30. Specifically, the constriction 30 is allowed to fragment at a specific plane 32.

The energy of the impact F1 is thus transformed into the energy of the fracture in this manner. The impact energy can completely be consumed in the shock absorbing body 24a. The impact energy is supposed to vanish away before it reaches the inward receiving surface 26. The HDD 21 is thus prevented from receiving a larger impact. The HDD 21 is surely protected from a larger impact.

In general, the HDD 21 is guaranteed against the impact smaller than a predetermined magnitude. The magnitude for the guarantee is set remarkably smaller than that for the other component incorporated in the notebook personal computer 11. An improved shock resistance of the HDD 21 is expected to result in an improved shock resistance of the entire notebook personal computer 11. According to an experiment by the inventors, the shock absorbing body 24a of the aforementioned type has established a higher performance of absorbing an impact as compared with a conventional shock absorbing member of an elastic material.

The shock absorbing body 24a may establish a strength enough to suffer from a breakage or fracture in response to the impact F1 exceeding the aforementioned predetermined magnitude. This strength can be achieved by adjusting the sectional area of the constriction 30, for example. On the other hand, the shock absorbing body 24a is also required to establish the performance of damping so as to reduce the impact F1, applied to the outward receiving surface 26, below the level of the predetermined magnitude. This performance of damping can be added to the shock absorbing body 24a by adjusting the hardness of the shock absorbing body 24a. For example, selection of an appropriate material contributes to the adjustment of the hardness.

Figure 6:
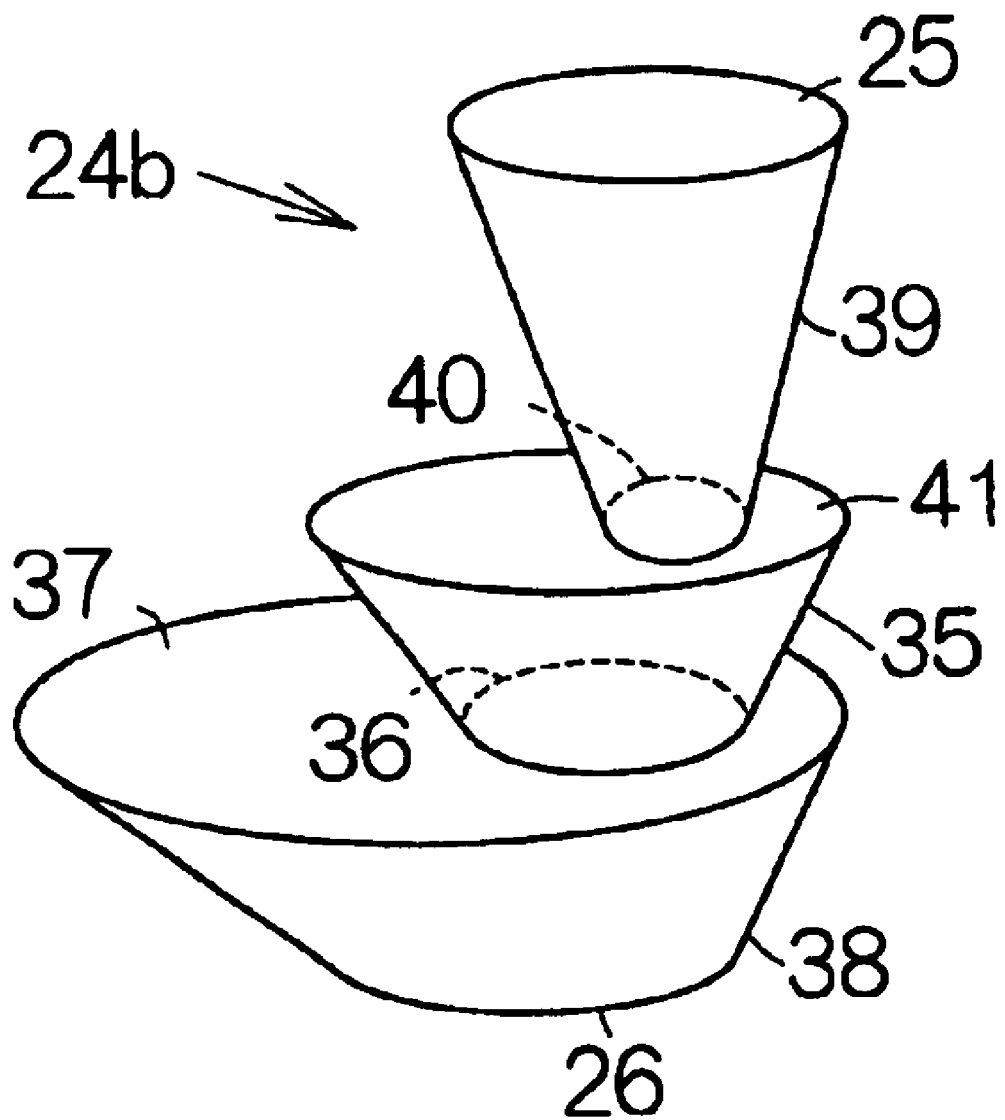
FIG. 6 is an enlarged perspective view schematically illustrating the structure of a unitary shock absorbing body according to a second specific example.

FIG. 6 illustrates a unitary shock absorbing body 24b according to a second specific example. The shock absorbing body 24b includes a first wedge body or portion 35 tapered toward the outward receiving surface 26, and a wedge receiving body or portion 38 connected to the smaller tip end of the first wedge body 35 at a first interface 36. The wedge receiving body 38 is designed to receive the smaller tip end of the first wedge body 35 at a planar surface 37, including the first interface 36, closer to the inward receiving surface 25. The outward receiving surface 26 is defined on the wedge receiving body 38 over the surface remotest from the inward receiving surface 25.

Additionally, the shock absorbing body 24b further includes a second wedge body or portion 39 likewise tapered toward the outward receiving surface 26. The smaller tip end of the second wedge body 39 is connected to the first wedge body 35 at a second interface 40 smaller than the first interface 36. The first wedge body 35 is designed to receive the smaller tip end of the second wedge body 39 at a planar surface 41, including the second interface 40, closer to the inward receiving surface 25. Specifically, the first wedge body 35 functions as a wedge receiving body for the second wedge body 39. The inward receiving surface 25 is defined on the second wedge body 39 over the surface remotest from the outward receiving surface 26. The unitary shock absorbing body 24b may be made by molding or else from a soft plastic material such as polyethylene plastic, a metallic material, or the like.

Figure 7A:
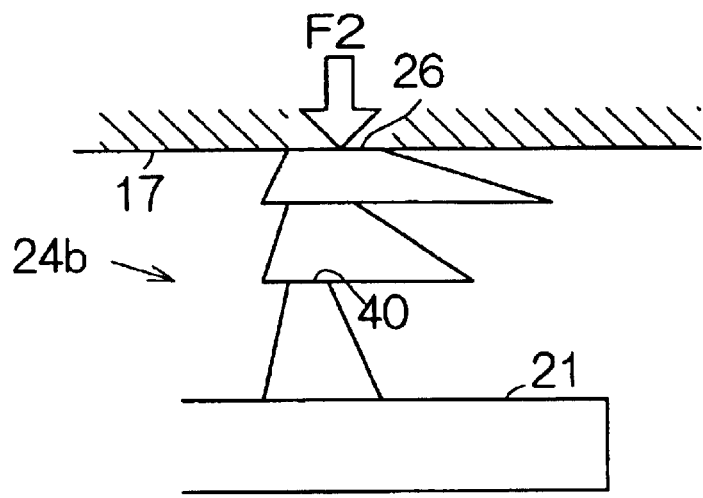
FIGS. 7A–7C are enlarged side views schematically illustrating the process of fracture of the shock absorbing body.
Figure 7B:
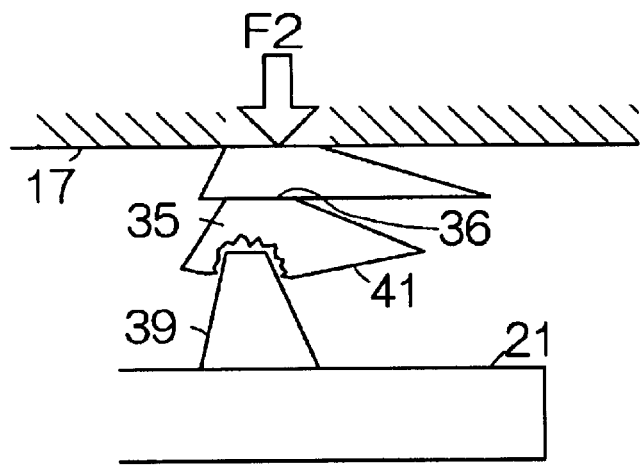

Now, when a larger impact F2 is applied to the outward receiving surface 26 in the direction normal to the outward receiving surface 26 in the aforementioned manner, the shock absorbing body 24b is collapsed between the enclosure 17 and the HDD 21, as shown in FIG. 7A, for example. In this case, the concentration of stress is first induced at the second interface 40 of the smallest sectional area. When the impact F2 reaches a first magnitude of a relatively lower level, the smaller tip end of the second wedge body 39 is forced to bite into the planar surface 41 over the first wedge body 35, as shown in FIG. 7B. The energy of the impact F2 applied to the second wedge body 39 is thus transformed into the energy of the fracture in this manner. The impact has been relieved.

Figure 7C:
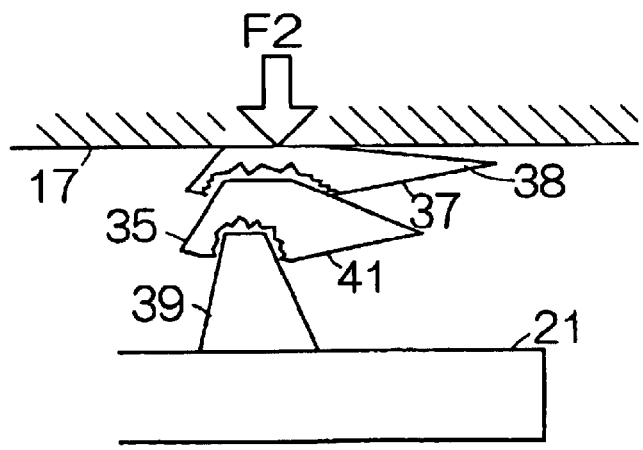

After the second wedge body 39 has bitten into the first wedge body 35, the concentration of stress is then induced at the first interface 36 of the second smallest sectional area. When the impact F2 reaches a second magnitude of a relatively higher level larger than the first magnitude, the smaller tip end of the first wedge body 35 is allowed to bite into the planar surface 37 over the wedge receiving body 38, as shown in FIG. 7C. The energy of the impact F2 applied to the first wedge body 35 is likewise transformed into the energy of the fracture in this manner.

The shock absorbing body 24b serves to sufficiently protect the HDD 21 from the impact F2 of the first and second magnitudes, namely, of the different levels. Note that the unitary shock absorbing body 24b may solely include a combination of the first wedge body 35 and the wedge receiving body 38. Otherwise, the unitary shock absorbing body 24b may include three or more superposed wedge bodies sequentially reduced in its dimensions. The shock absorbing body 24b of this type may contribute to a reliable protection of the HDD 21 from the impact F2 of the three or more different magnitudes. It should be noted that the wedge bodies such as the first and second wedge bodies 35, 39 may be tapered toward the inward receiving surface 25 in the shock absorbing body 24b to the contrary to the aforementioned arrangement.

Figure 8:
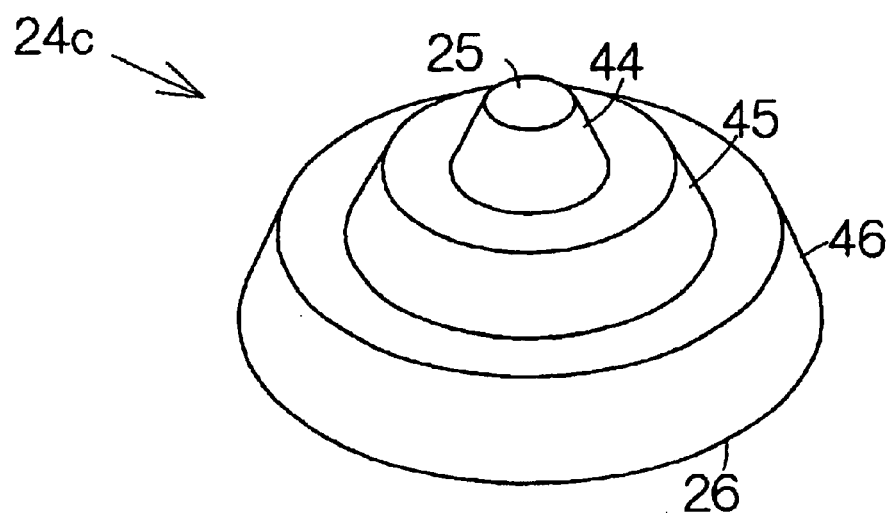
FIG. 8 is an enlarged perspective view schematically illustrating the structure of a unitary shock absorbing body according to a third specific example.

FIG. 8 illustrates a unitary shock absorbing body 24c according to a third specific example. The shock absorbing body 24c includes a first short hollow barrel body or portion 44 tapered toward the inward receiving surface 25. The first barrel body 44 is designed to define the inward receiving surface 25 along a plane remotest from the outward receiving surface 26.

A second short hollow barrel body or portion 45 is connected to the first barrel body 44. The first barrel body 44 receives the second barrel body 45 at the surface closer to the outward receiving surface 26. The second barrel body 45 is likewise tapered toward the inward receiving surface 25. A third short hollow barrel body or portion 46 is also connected to the second barrel body 45. The second barrel body 45 likewise receives the third barrel body 46 at the surface closer to the outward receiving surface 26. The third barrel body 46 is likewise tapered toward the inward receiving surface 25. The third barrel body 46 is designed to define the outward receiving surface 26 along a plane remotest from the inward receiving surface 25.

Figure 9:
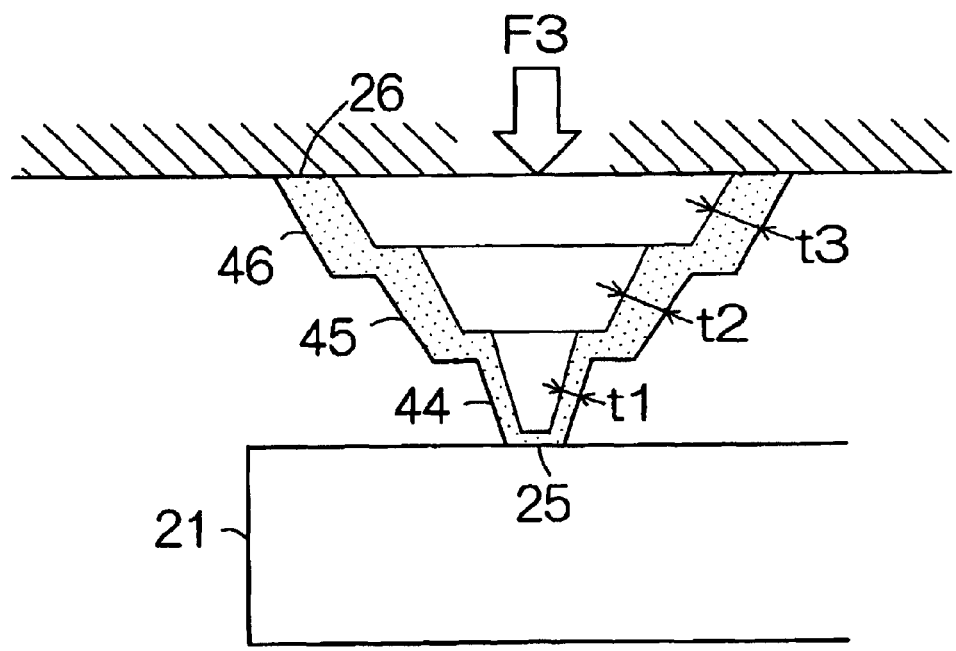
FIG. 9 is an enlarged sectional view of the shock absorbing body.

As is apparent from FIG. 9, the wall thickness t2 of the second barrel body 45 is set larger than the wall thickness t1 of the first barrel body 44, while the wall thickness t3 of the third barrel body 46 is set larger than the aforementioned wall thickness t2. The unitary shock absorbing body 24c may be made by molding or else from a soft plastic material such as polyethylene plastic, a metallic material, or the like.

Now, when a larger impact F3 is applied to the outward receiving surface 26 in the direction normal to the outward receiving surface 26 in the aforementioned manner, the shock absorbing body 24c is collapsed between the enclosure 17 and the HDD 21, as shown in FIG. 9, for example. The concentration of stress is first induced at the first barrel body 44 of the smallest sectional area. When the impact F3 reaches a first magnitude of a relatively lower level, the first barrel body 44 is forced to crash. The energy of the impact F3 is thus transformed into the energy of the fracture in the first barrel body 44.

After the first barrel body 44 has crashed, the concentration of stress is then induced at the second barrel body 45 of the second smallest sectional area. When the impact F3 reaches a second magnitude of a relatively higher level larger than the first magnitude, the second barrel body 45 is forced to crash. The energy of the impact F3 is thus transformed into the energy of the fracture in the second barrel body 45.

After the second barrel body 45 has crashed in the above-described manner, the concentration of stress is then induced at the third barrel body 46 of the third smallest sectional area. When the impact F3 reaches a third magnitude of a still higher level larger than the second magnitude, the third barrel body 46 is forced to crash. The energy of the impact F3 is thus transformed into the energy of the fracture in the third barrel body 46.

The shock absorbing body 24c serves to sufficiently protect the HDD 21 from the impact F3 of the first, second and third magnitudes, namely, of the three different levels. Note that the unitary shock absorbing body 24c may solely include a combination of the first and second short hollow barrel bodies 44, 45. Otherwise, the unitary shock absorbing body 24c may include four or more superposed short hollow barrel bodies sequentially reduced in its dimensions. The shock absorbing body 24c of this type may contribute to a reliable protection of the HDD 21 from the impact F3 of the four or more different magnitudes. It should be noted that the short hollow barrel bodies such as the first, second and third barrel bodies 44, 45, 46 may be tapered toward the outward receiving surface 26 in the shock absorbing body 24c to the contrary to the aforementioned arrangement.

Figure 10:
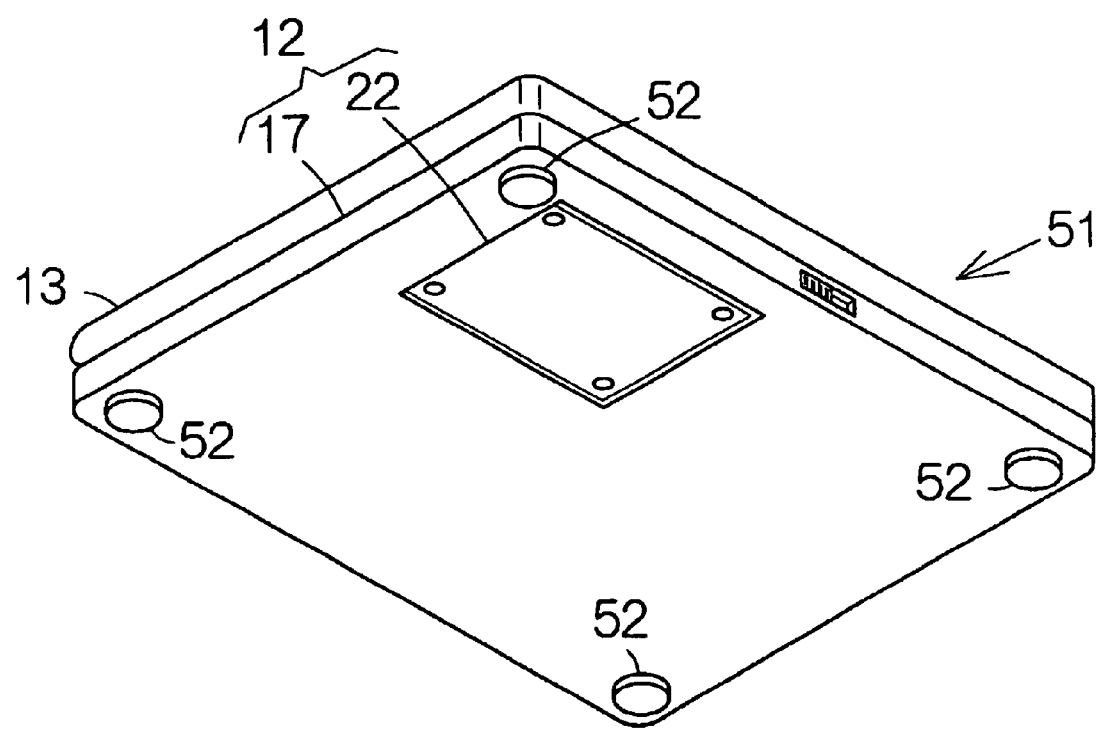
FIG. 10 is a perspective view illustrating a notebook personal computer as an electronic apparatus according to a second embodiment of the present invention.

FIG. 10 schematically illustrates a notebook personal computer 51 as an electronic apparatus according to a second embodiment of the present invention. The notebook personal computer 51 includes a main body 12 and a display panel unit 13 in the same manner as the aforementioned first embodiment. An internal component such as a hard disk drive (HDD) 21 is incorporated within an enclosure 17 of the main body 12 in the aforementioned manner, for example. Pedestals or pads 52 are fixed to the exterior surface of the enclosure 17, namely, an enclosure body 19. The pedestals 52 may be located at four corners of the backside of the main body 12, for example. When the notebook personal computer 51 is manipulated, the main body 12 may be supported on the desk with four pedestals 52, for example.

Figure 11:
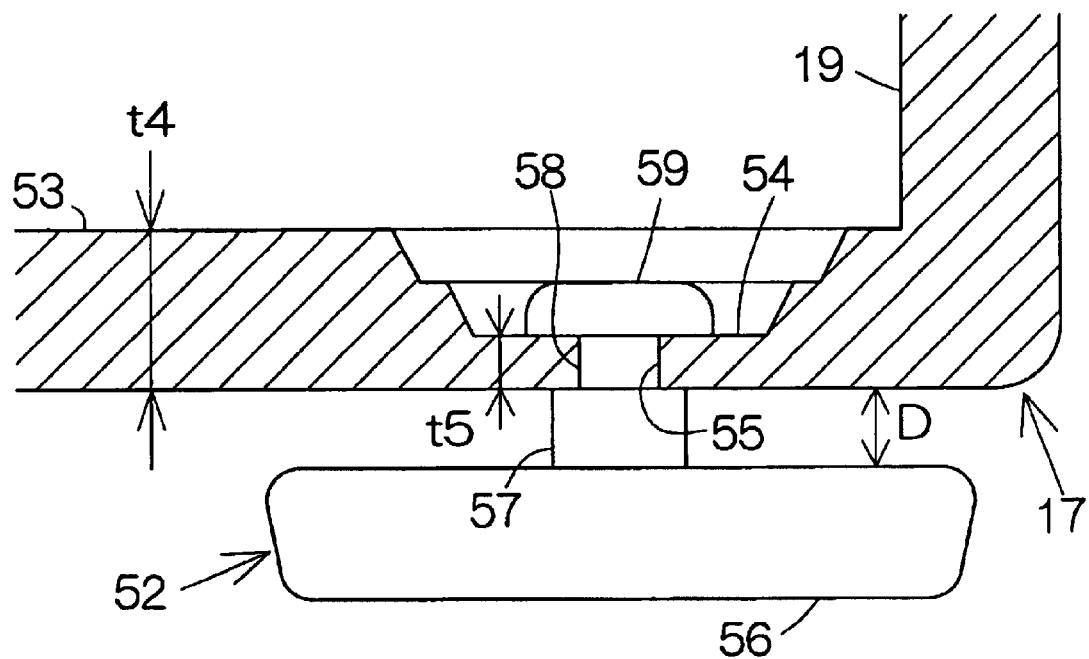
FIG. 11 is an enlarged sectional view schematically illustrating a part of an enclosure body in the electronic apparatus.

As is apparent from FIG. 11, the enclosure body 19 of the enclosure 17 is designed to have a predetermined wall thickness t4 over a rigid area 53. The predetermined wall thickness t4 serves to establish, at the rigid area 53, a strength enough to suffer from a fracture in response to an impact of a first magnitude. The enclosure body 19 is also designed to define a shock absorbing area 54 extending in the vicinity of the pedestal 52. The wall thickness t5 at the shock absorbing area 54 is set smaller than the predetermined wall thickness t4. The wall thickness t5 smaller than the predetermined wall thickness t4 serves to establish, at the shock absorbing area 54, a strength enough to suffer from a fracture in response to an impact of a predetermined or second magnitude smaller than the first magnitude. In other words, the shock absorbing area 54 is apt to crash or be broken as compared with the rigid area 53. An attachment hole 55 is defined at the center of the shock absorbing area 54.

The individual pedestal 52 includes a disk portion 56 spaced from the surface of the enclosure body 19 by a predetermined distance D, and a stem portion 57 standing on the disk portion 56 toward the surface of the enclosure body 19. The stem portion 57 is designed to allow its tip end to impinge against the shock absorbing area 54 around the attachment hole 55. The pedestal 52 may be made by molding or else from a soft plastic material such as polyethylene plastic, a metallic material, or the like.

A smaller stem portion 58 is integrally formed on the tip end of the stem portion 57. The smaller stem portion 58 is allowed to enter the attachment hole 55. A flange 59 is integrally formed on the tip end of the smaller stem portion 58 so as to extend outward from the smaller stem portion 58. The flange 59 serves to prevent the smaller stem portion 58 from being released from the attachment hole 55. The flange 59 also serves to hold the enclosure body 19 against the tip end of the stem portion 57, so that a relative movement can be suppressed between the pedestal 52 and the enclosure body 19. When the pedestal 52 is to be attached to the enclosure body 19, the flange 59 is allowed to achieve an elastic deformation so as to pass through the attachment hole 55 of the smaller diameter. Otherwise, a screw may be employed to fix the smaller stem portion 58 along with the flange 59 onto the tip end of the stem portion 57, for example.

Figure 12:
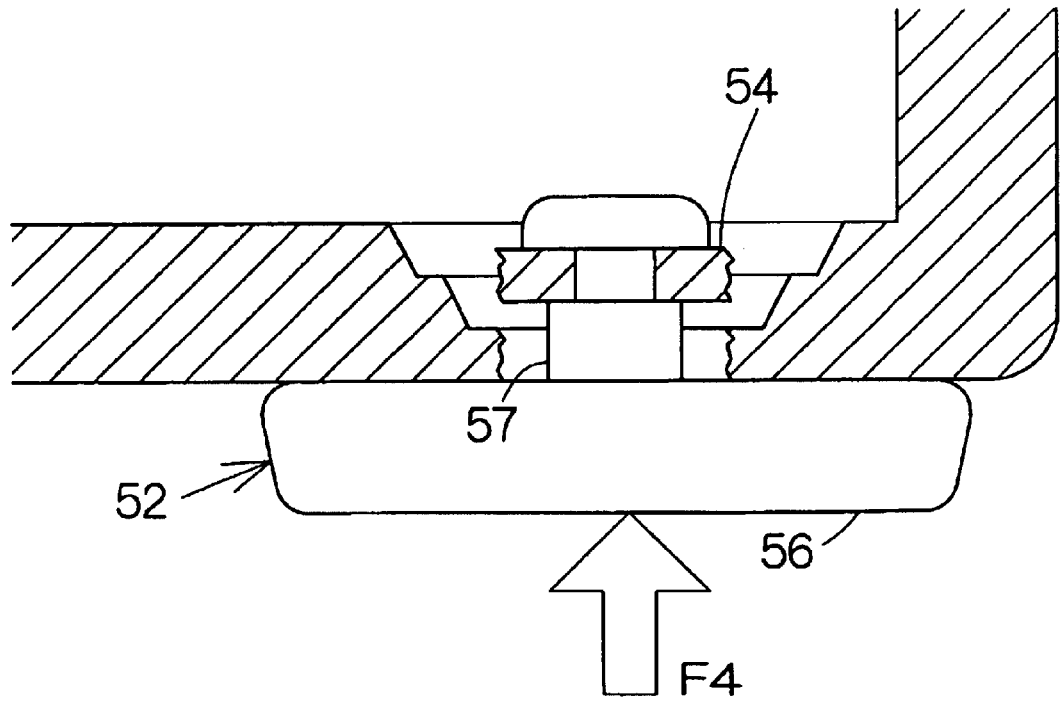
FIG. 12 is an enlarged sectional view, corresponding to FIG. 11, for schematically illustrating the process of a fracture induced at a shock absorbing area.

Now, assume that the pedestal 52 suffers from an impact resulting from drop of the notebook personal computer 51 onto the ground, for example. As shown in FIG. 11, the disk portion 56 of the pedestal 52 receives an impact F4 over a broader area. When the received impact F4 is transmitted to the stem portion 57 from the disk portion 56, the impact F4 is amplified in response to reduction in area. The amplified impact F4 is then allowed to act on the shock absorbing area 54. When the amplified impact F4 reaches a predetermined magnitude, the shock absorbing area 54 is forced to suffer from a fracture, as shown in FIG. 12, for example. In this manner, the impact F4 applied to the pedestal 52 is transformed into the energy of the fracture. The impact energy is sufficiently consumed at the shock absorbing area 54. The enclosure body 19 is prevented from receiving the larger impact F4. The HDD 12 incorporated within the enclosure body 19 is thus sufficiently protected from the larger impact F4.

Figure 13:
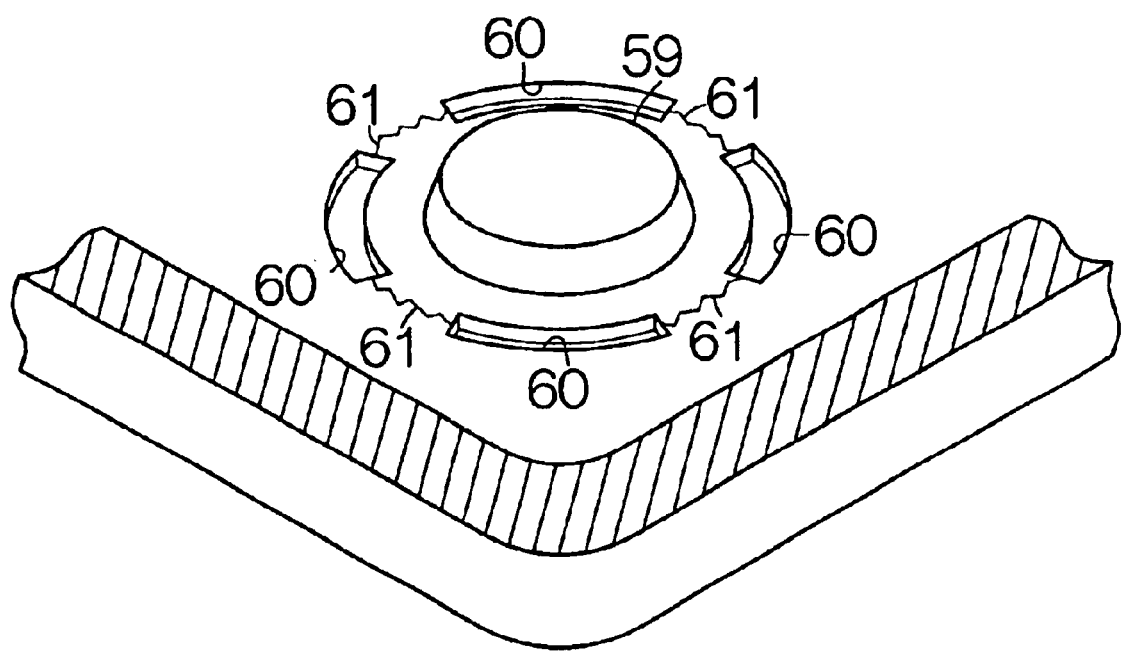
FIG. 13 is an enlarged partial perspective view schematically illustrating a shock absorbing area of another specific example.

In the aforementioned notebook personal computer 51, slits 60 may be defined in the enclosure body 19 in the vicinity of the pedestal 52 so as to establish the shock absorbing area 54, as shown in FIG. 13, for example. The slits 60 may be arranged along an imaginary circle. The slits 60 are expected to induce cracks 61 in the enclosure body 19 between the adjacent slits 60 when an impact F4 is applied to the pedestal 52 in the above-described manner. The cracks 61 realize a fracture of the shock absorbing area 54. It should be noted that the shock absorbing area 54 may be employed in combination with the aforementioned shock absorbing member 23, or take place of the aforementioned shock absorbing member 23.

Figure 14:
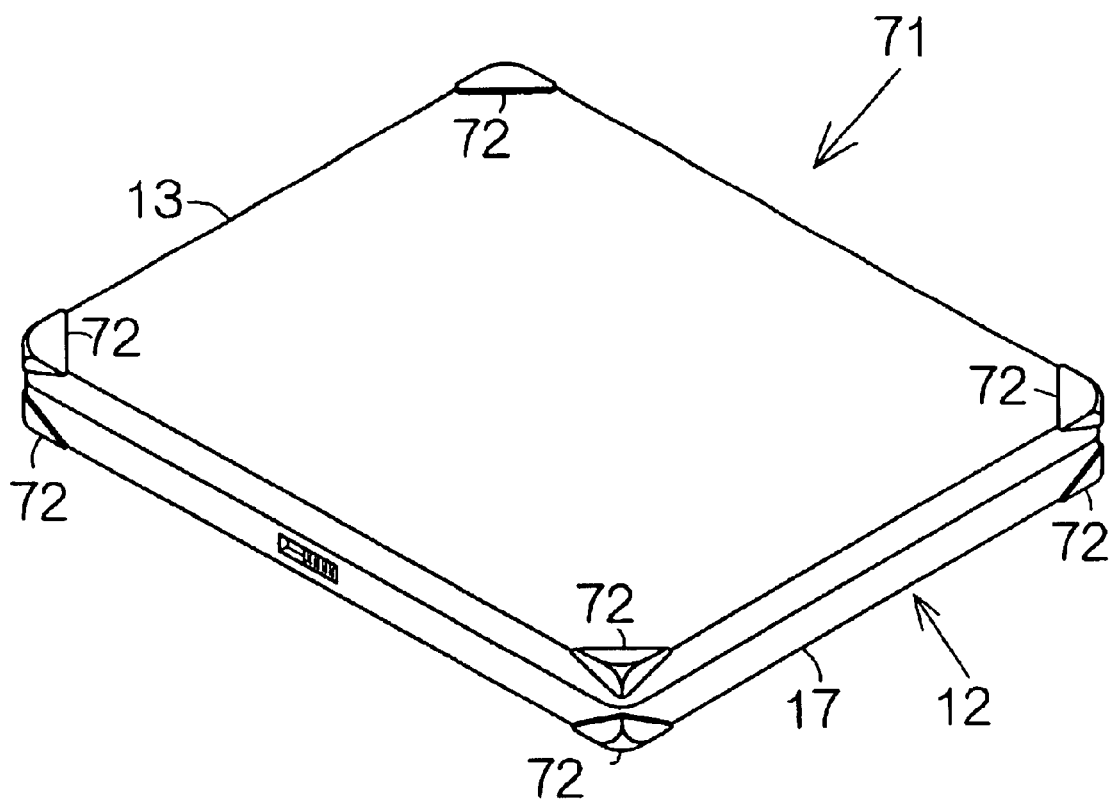
FIG. 14 is a perspective view illustrating a notebook personal computer as an electronic apparatus according to a third embodiment of the present invention.

FIG. 14 schematically illustrates a notebook personal computer 71 as an electronic apparatus according to a third embodiment of the present invention. The notebook personal computer 71 includes a main body 12 and a display panel unit 13 in the same manner as the aforementioned first and second embodiments. An internal component such as a hard disk drive (HDD) 21 is incorporated within an enclosure 17 of the main body 12 in the aforementioned manner, for example. A shock absorbing body 72 is fixed on the enclosure 17 at the individual corner or apex.

Figure 15:
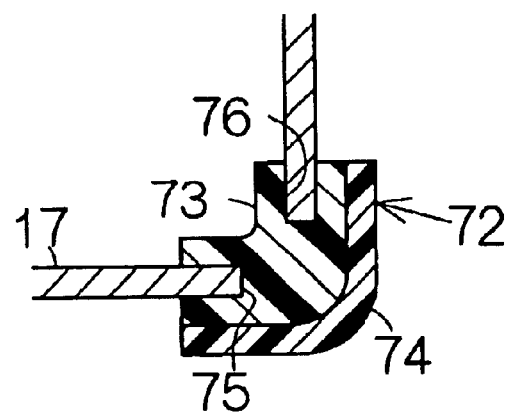
FIG. 15 is an enlarged partial view of an enclosure for illustrating the structure of a shock absorbing body.

As is apparent from FIG. 15, the shock absorbing body 72 includes a first elastic member 73 designed to form the apex of the enclosure 17 in place of the enclosure 17 itself, and a second elastic member 74 laminated over the first elastic member 73 so as to cover over the exterior surface of the first elastic member 73. The rigidity of a first level is established in the first elastic member 73 while the rigidity of a second level smaller than the first level is established in the second elastic member 74. The rigidity of the first elastic member 73 may be set sufficiently smaller than that of the enclosure 17.

The first elastic member 73 is fitted within a triangular receiving bore 75 defined at the apex of the enclosure 17, for example. Three straight lines connecting the edges leading to the single apex of the enclosure 17 to each other serve to define the receiving bore 75. A groove 76 is defined in the first elastic member 73 so as to receive the edges of the enclosure 17 around the receiving bore 75.

Figure 16:
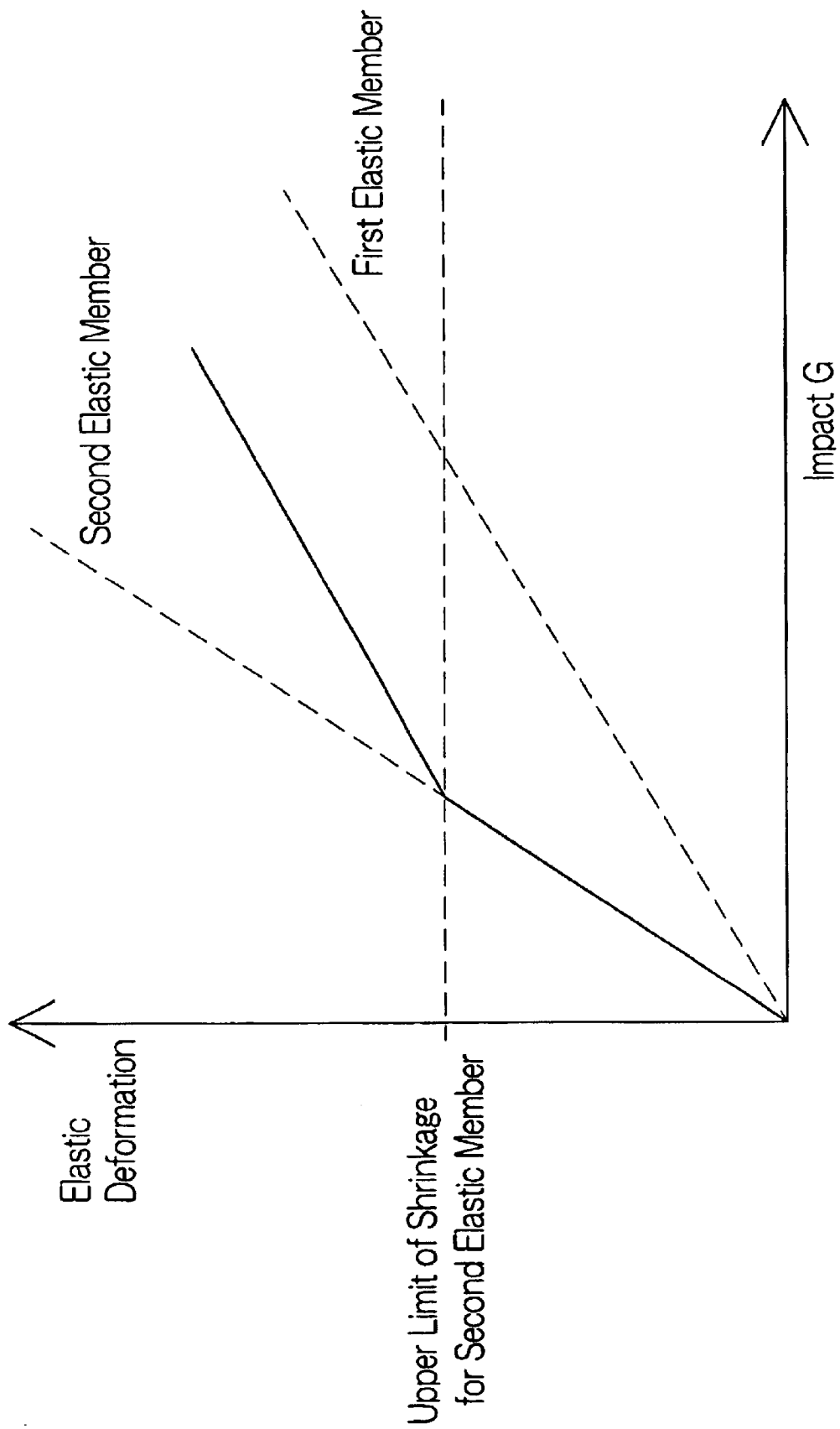
FIG. 16 is a graph showing the performance of first and second elastic members.

The shock absorbing body 72 serves to sufficiently absorb a relatively small impact at the second elastic member 74, as shown in FIG. 16, for example. The enclosure 17 can be prevented from the small impact. The HDD 21 in the enclosure 17 is thus sufficiently protected from the small impact.

When a relatively large impact is applied to the shock absorbing body 72, the elastic deformation of the second elastic member 74 reaches the upper limit. The impact is transmitted to the first elastic member 73. The large impact is thus sufficiently absorbed at the first elastic member 73. The enclosure 71 is prevented from receiving the large impact. The HDD 21 in the enclosure 17 is sufficiently protected from the large impact in this manner. The shock absorbing body 72 serves to establish a higher performance of absorbing an impact over a broader range of magnitude as compared with the case where the first and second elastic members 73, 74 are separately employed. In addition, the thickness of the shock absorbing body 72 can be reduced as compared with the case where the second elastic member 74 is solely employed to achieve the same performance. It should be noted that the shock absorbing body 72 may be employed in combination with the aforementioned shock absorbing member 23 as well as the shock absorbing area 54, or take place of the shock absorbing member 23 and the shock absorbing area 54.

Figure 17:
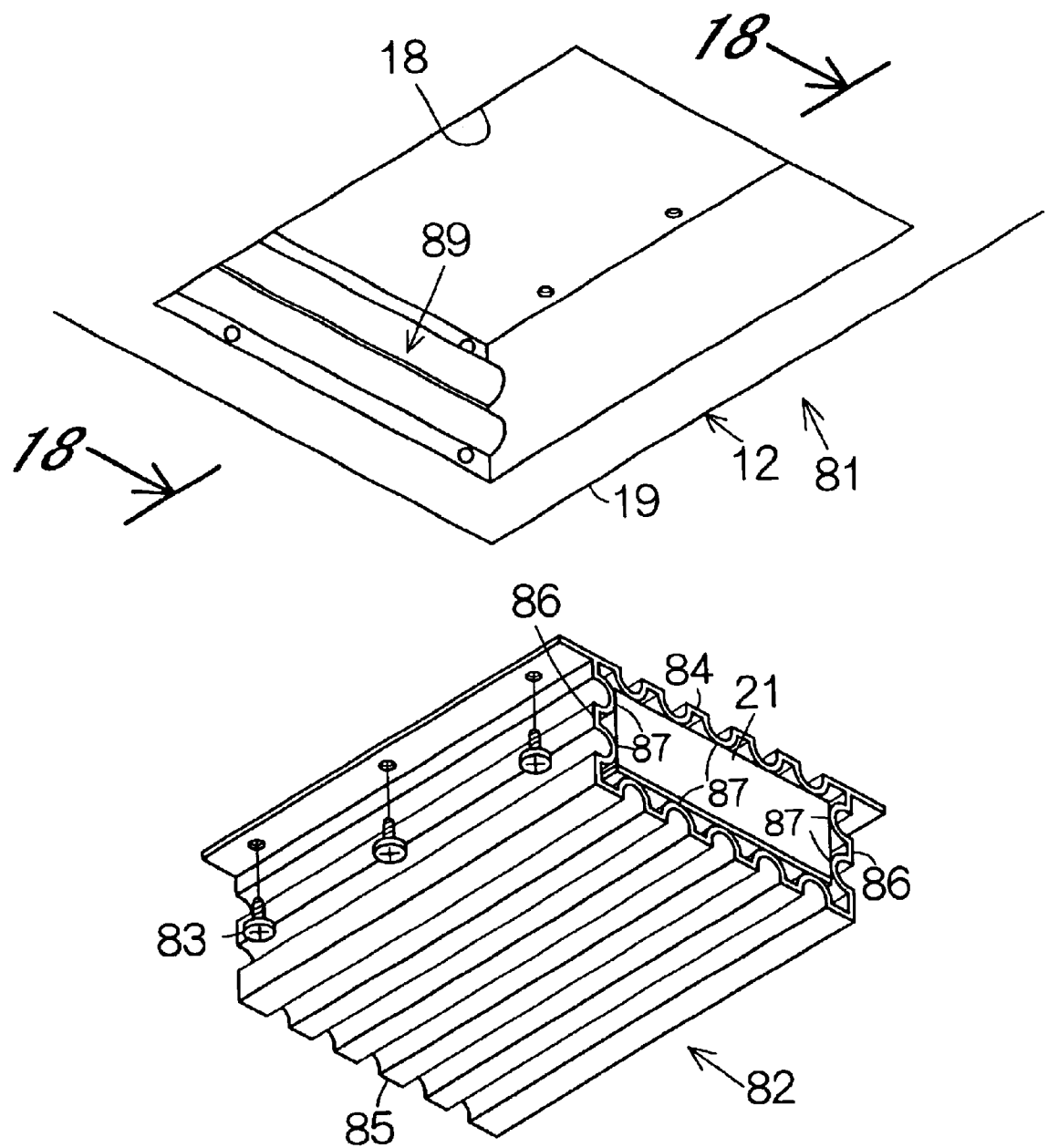
FIG. 17 is a perspective view illustrating a notebook personal computer as an electronic apparatus according to a fourth embodiment of the present invention.

FIG. 17 schematically illustrates a part of a notebook personal computer 81 as an electronic apparatus according to a fourth embodiment of the present invention. The notebook personal computer 81 includes a main body 12 as well as a display panel unit 13 in the same manner as the aforementioned first to third embodiments. An enclosure 17 of the main body 12 includes an enclosure body 19 defining an inner space 18 inside in the aforementioned manner. The inner space 18 is designed to open at the backside or bottom of the main body 12. An internal component such as a hard disk drive (HDD) 21 is received within the inner space 18. When the main body 12 is placed on the desk or else, for example, for the manipulation of a user, the HDD 21 is allowed to take a horizontal attitude in the inner space 18. The magnetic recording disk, not shown, in the HDD 21 rotates about the vertical rotational axis. The opening of the inner space 18 may be closed with a cover 22 in the aforementioned manner.

A frame 82 according to a first specific example is fixed to the enclosure body 19 so as to establish the stable support of the HDD 21 in the inner space 18. The frame 82 includes a attachment plate 84 fixed to the top surface of the inner space 18 with screws 83, for example, and a bottom plate 85 spaced from the attachment plate 84 so as to define an occupation space for the HDD 21 between the attachment plate 84 and itself. A pair of connecting plates 86 serve to connect the attachment plate 84 and the bottom plate 85 to each other at the opposite sides of the occupation space for the HDD 21. The occupation space for the HDD 21 is thus surrounded by an endless wall comprising the attachment plate 84, the bottom plate 85 and the connecting plates 86. In this case, the attachment plate 84 is opposed to the upper or top surface of the HDD 21, while the bottom plate 85 is opposed to the backside or bottom surface of the HDD 21.

As is apparent from FIG. 17, contact pieces or bent plates 87 are shaped in the attachment plate 84, the bottom plate 85 and the connecting plates 86, respectively. The bent plates 87 are designed to rise from the plates 84, 85, 86, respectively, so as to receive the HDD 21. The bent plates 87 are expected to establish a sufficient elasticity at the bending portion. Specifically, the individual bent plate 87 is allowed to function as an elastic piece. Here, the individual bent plate 87 is formed to extend along the periphery of a semicylinder which extends from one end of the frame 82 to the other end. The adjacent bent plates 87 may be arranged side by side in parallel with each other. The HDD 21 is held between the bent plates 87 on the attachment plate 84 and the bent plates 87 on the bottom plate 85 opposed to the attachment plate 84 as well as between the bent plates 87 on the connecting plates 86 opposed to each other.

Figure 18:
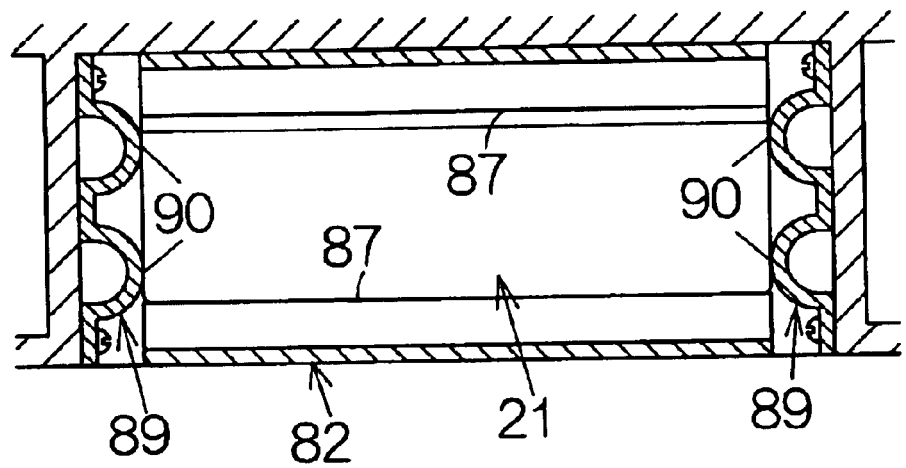
FIG. 18 is a sectional view taken along the line 18—18 in FIG. 17 for illustrating a hard disk drive (HDD) incorporated within the notebook personal computer.

Front and rear auxiliary frames 89 are located in the inner space 18. When the HDD 21 held in the frame 82 is inserted into the inner space 18, the auxiliary frames 89 are allowed to receive the front and rear ends of the HDD 21, respectively, as is apparent from FIG. 18. In general, a connector comprising a flexible printed circuit board (FPC) may be coupled to any of the front and rear ends of the HDD 21, for example.

Contact pieces or bent plates 90 are also shaped in the respective auxiliary frames 89 in the same manner as the aforementioned bent plates 87 on the attachment plate 84, the bottom plate 85 and the connecting plates 86. The bent plates 90 are designed to rise from the auxiliary frames 89, respectively, so as to receive the HDD 21. The individual bent plate 90 is formed to extend along the periphery of a semicylinder which extends from one end of the auxiliary frame 89 to the other end in the horizontal direction. Specifically, the individual bent plate 90 is allowed to function as an elastic piece by utilizing the action of the bending portion. It should be noted that the frame 82 and the auxiliary frames 89 may be made from a metallic material such as aluminum, copper, or the like, or made by molding from a hard plastic material expected to have the rigidity equivalent to that of the metallic material. The frame 82 and the auxiliary frames 89 should have the rigidity at least enough to maintain its original shape by themselves.

Figure 19:
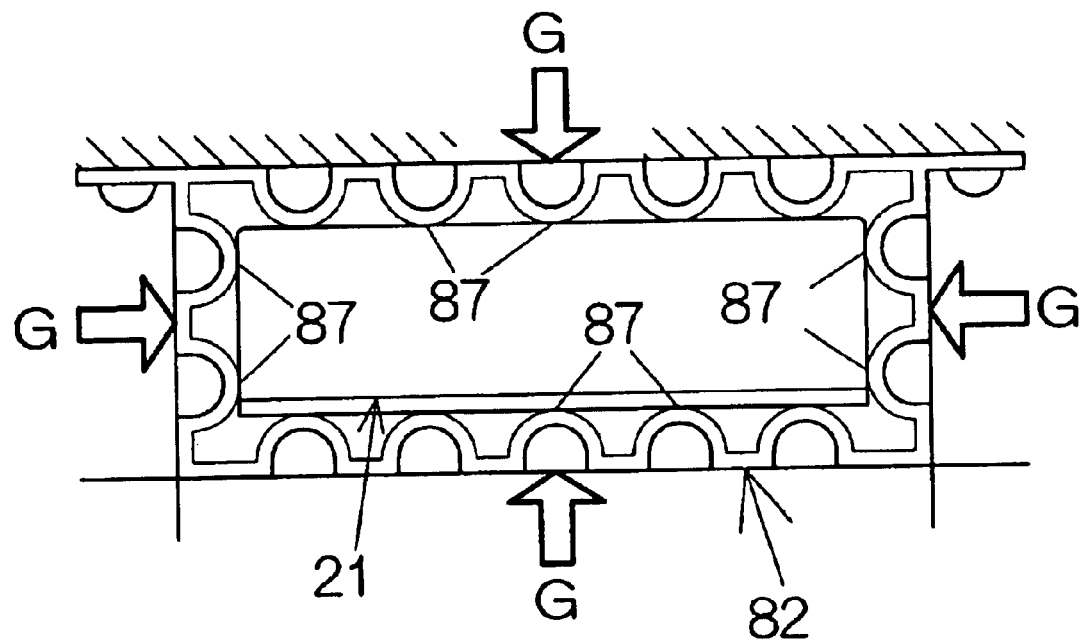
FIG. 19 is a front view illustrating the front end of the HDD incorporated in a frame according to a first specific example.

The HDD 21 is supported in the inner space 18 by the bent plates 87, 90 on the frame 82 and the auxiliary frames 89. The HDD 21 is prevented from contacting or touching the frame 82 and the auxiliary frames 89 without interposition of the bent plates 87, 90. When the notebook personal computer 81 is dropped on the ground or else from a higher elevation, a larger impact G is applied to the enclosure 17 of the notebook personal computer 82, as shown in FIG. 19. In this case, the frame 87 and the auxiliary frames 89 allow the bent plates 87, 90 to collapse between the enclosure 17 and the HDD 21. The bending portions defined in the bent plates 87, 90 are apt to elastically deform. The energy of the impact G is thus transformed into the energy of an elastic deformation. The impact energy can sufficiently be consumed in the bent plates 87, 90. Specifically, the HDD 21 is prevented from receiving the larger impact G. The HDD 21 is thus sufficiently protected from the impact G. A combination of the frame 82, surrounding the HDD 21, and the auxiliary frames 89, interposing the HDD 21 in the back-and-forth direction, enables a reliable absorption of the impact G in any directions.

Figure 20:
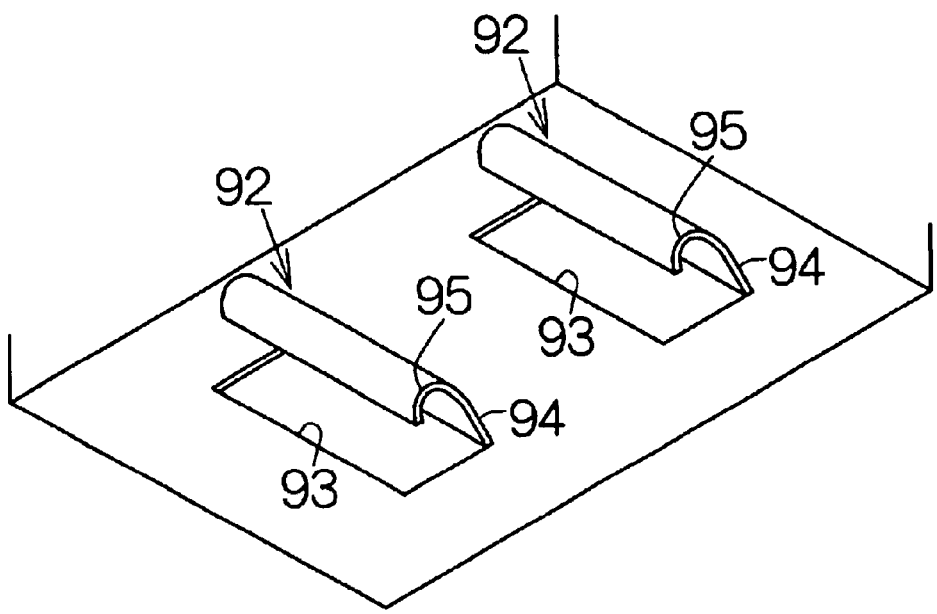
FIG. 20 is a perspective view schematically illustrating the structure of an elastic plate according to another specific example.

As shown in FIG. 20, elastic plates 92 may be employed in the frame 82 and the auxiliary frames 89 in place of the aforementioned bent plates 87, 90, for example. The individual elastic plate 92 includes an upright portion 94 and a bending portion 95 connected to the tip end of the upright portion 94. The upright portion 94 is designed to rise from the edge of an opening 93, defined in the frame 82 or the auxiliary frames 89, into the occupation space for the HDD 21. The bending portion 95 is designed to contact the HDD 21 over a straight line. The elastic plate 92 may be cut out of the frame 82 or the auxiliary frames 89 made of an aluminum plate, a copper plate, or the like.

When a larger impact G is applied to the enclosure 17 upon drop of the notebook personal computer 81 onto the ground or else, the elastic plates 92 allow the bending portions 95 to elastically deform between the enclosure 17 and the HDD 21 in response to the impact G. The energy of the impact G is thus transformed into the energy of an elastic deformation. The impact energy can sufficiently be consumed in the respective elastic plates 92. Specifically, the HDD 21 is prevented from receiving the larger impact G. The HDD 21 is thus sufficiently protected from the impact G.

Figure 21:
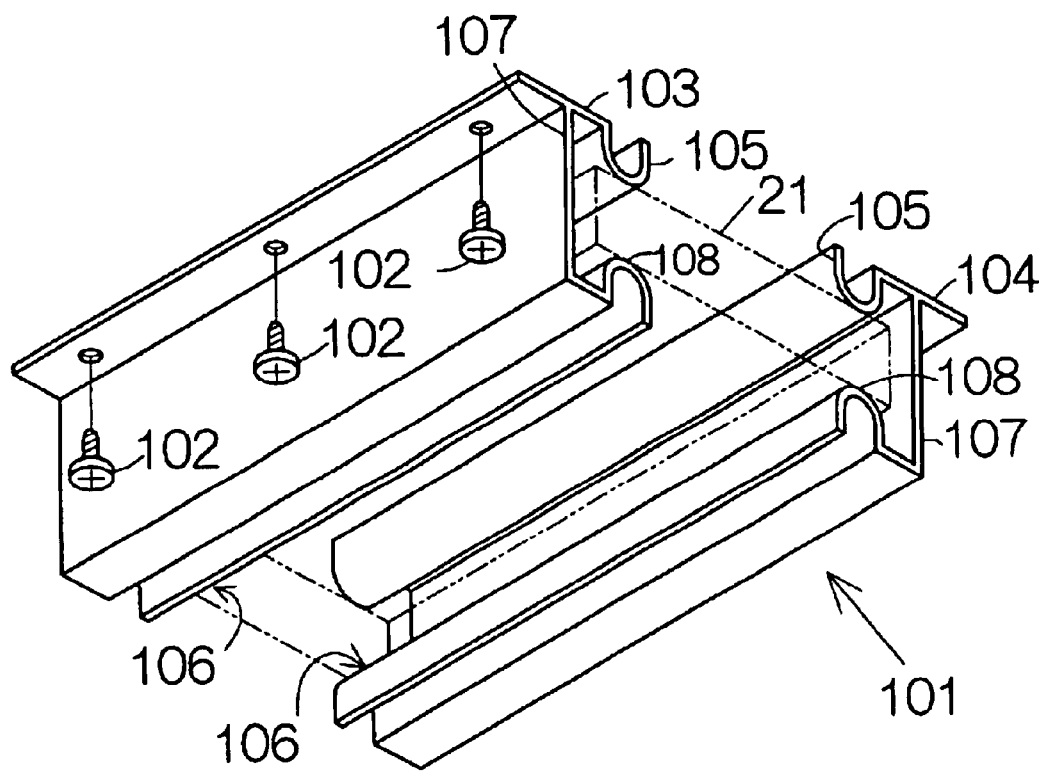
FIG. 21 is a perspective view schematically illustrating the structure of a frame according to a second specific example.

As shown in FIG. 21, a frame 101 according to a second specific example may be employed to support the HDD 21 in the inner space 18 in the notebook personal computer 81 in place of the aforementioned frame 82, for example. The frame 101 includes a first attachment member or plate 103 coupled to the top surface of the inner space 18 with screws 102, for example, and a second attachment member or plate 104 likewise coupled to the top surface of the inner space 18 at a position spaced from the first attachment plate 103. Elastic plates 105, 105 are integrally formed on the first and second attachment plates 103, 104 so as to rise from the first and second attachment plates 103, 104, respectively. A bending portion is defined in the individual elastic plate 105 so as to establish a sufficient elasticity. The individual elastic plate 105 is formed to extend along the periphery of a semicylinder which extends from one end of the attachment plate 103, 104 to the other end.

Contact pieces or elastic plates 106 are also integrally formed on the first and second attachment plates 103, 104, respectively. The elastic plates 106 are designed to rise from the first and second attachment plates 103, 104, respectively, so as to receive the HDD 21. The individual elastic plate 106 includes an upright plate 107 standing on the surface of the attachment plate 103, 104 in the direction normal to the surface of the attachment plate 103, 104, and a bending portion 108 seamlessly formed at the tip end of the upright plate 107 so as to contact the HDD 21. Here, the bending portion 108 is formed to extend along the periphery of a semicylinder which extends in parallel with the corresponding elastic plate 105. The bending portion 108 and the corresponding elastic plate 105 in combination serve to interpose the occupation space for the HDD 21 therebetween. It should be noted that the frame 101 may be made from a metallic material such as aluminum, copper, or the like, or made by molding from a hard plastic material expected to have the rigidity equivalent to that of the metallic material. The frame 101 should have the rigidity at least enough to maintain its original shape by its own.

Figure 22:
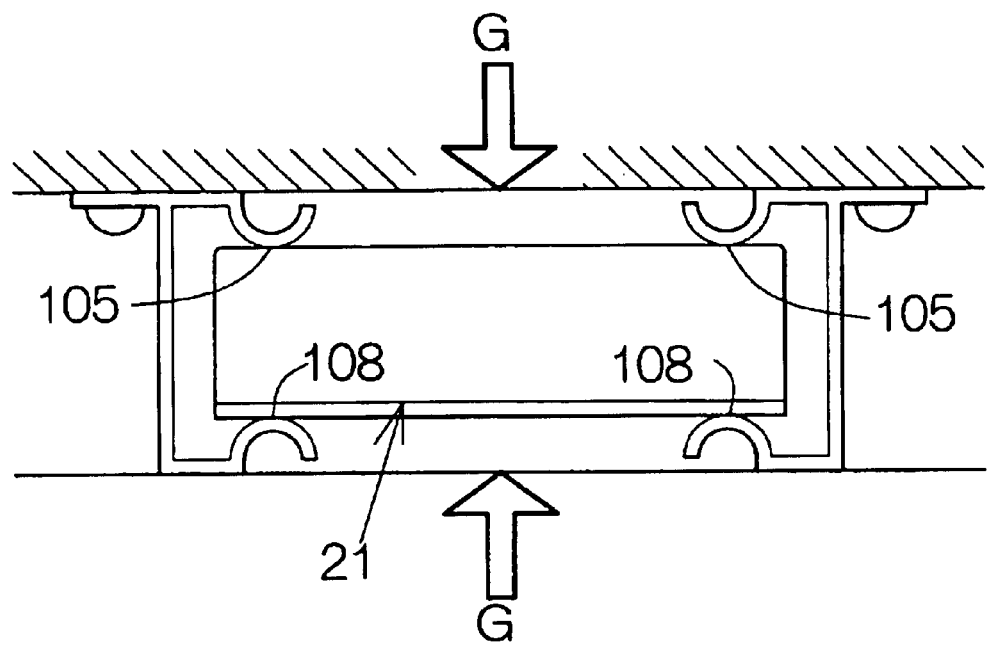
FIG. 22 is a front view illustrating the front end of the HDD received within the frame according to the second specific example.

The HDD 21 is interposed between the elastic plates 105 and the bending portions 108 of the elastic plates 106 within the inner space 18. The HDD 21 is prevented from contacting or touching the frame 101 without interposition of the elastic plates 105 and the bending portions 108 of the elastic plates 106. When the notebook personal computer 81 is dropped on the ground or else from a higher elevation, a larger impact G is applied to the enclosure 17 of the notebook personal computer 81, as shown in FIG. 22. In this case, the frame 101 allows the elastic plates 105 and/or the bending portions 108 to collapse between the enclosure 17 and the HDD 21. The energy of the impact is thus transformed into the energy of an elastic deformation. The impact energy can sufficiently be consumed in the elastic plates 105 and/or the bending portions 108 of the elastic plates 106. Specifically, the HDD 21 is prevented from receiving the larger impact G. The HDD 21 is thus sufficiently protected from the larger impact G.

In particular, the frame 101 is expected to greatly contribute to shock absorption in the case where the larger impact G is applied to the HDD 21 in the vertical direction along which the rotational axis of the magnetic recording disk extends in the HDD 21. In general, when the larger impact G is applied in the vertical direction of the HDD 21, the magnetic recording disk tends to suffer from a damage or scratch on the surface by the collision of the head slider carrying a read/write head element. A sufficient absorption of the larger impact G in the vertical direction of the HDD 21 contributes to a reliable protection of the HDD 21 from the larger impact G.

Figure 23:
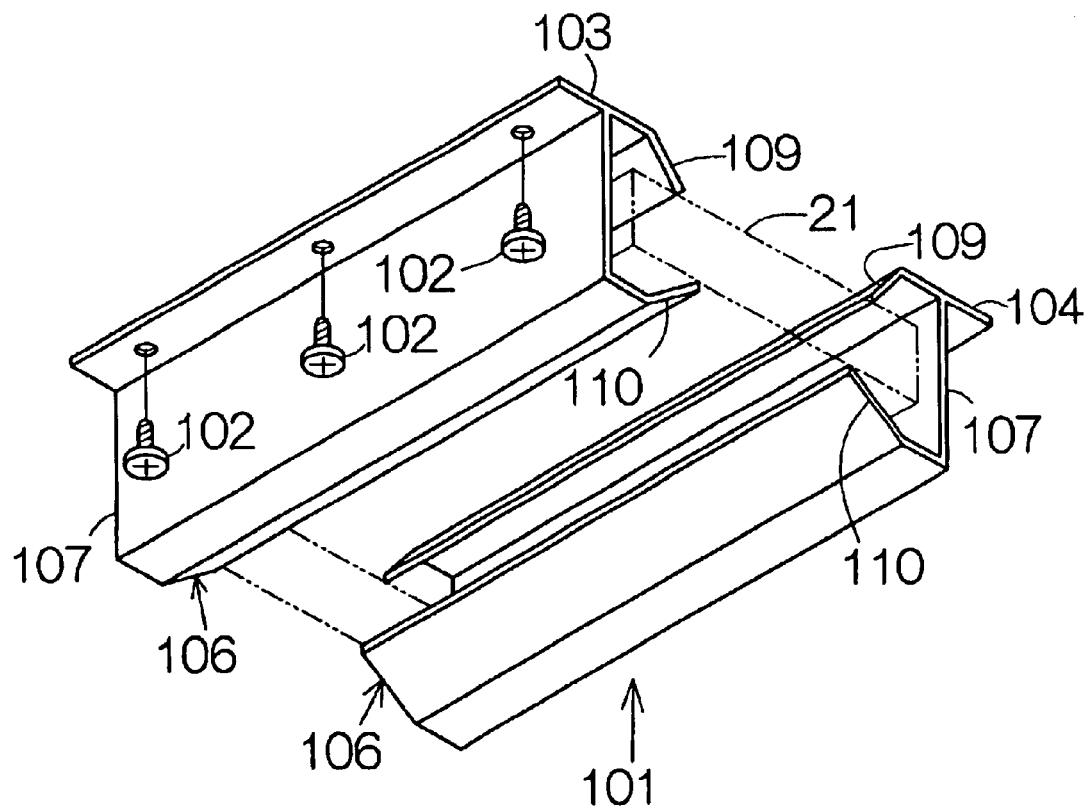
FIG. 23 is a perspective view illustrating a modification of the frame according to the second specific example.

As shown in FIG. 23, flat plates 109, 110 may be employed in the frame 101 in place of the aforementioned elastic plates 105 and bending portions 108, for example. The flat plates 109, 110 are designed to intersect the exterior surface of the HDD 21 by a predetermined inclined angle. The flat plates 109, 110 are expected to achieve the same performance as the aforementioned elastic plates 105 and the bending portions 108. The intersection by the predetermined inclined angle serves to easily induce an elastic deformation when an impact is applied in the vertical direction of the HDD 21, as compared with a flat plate which takes the attitude normal to the exterior surface of the HDD 21.

Figure 24:
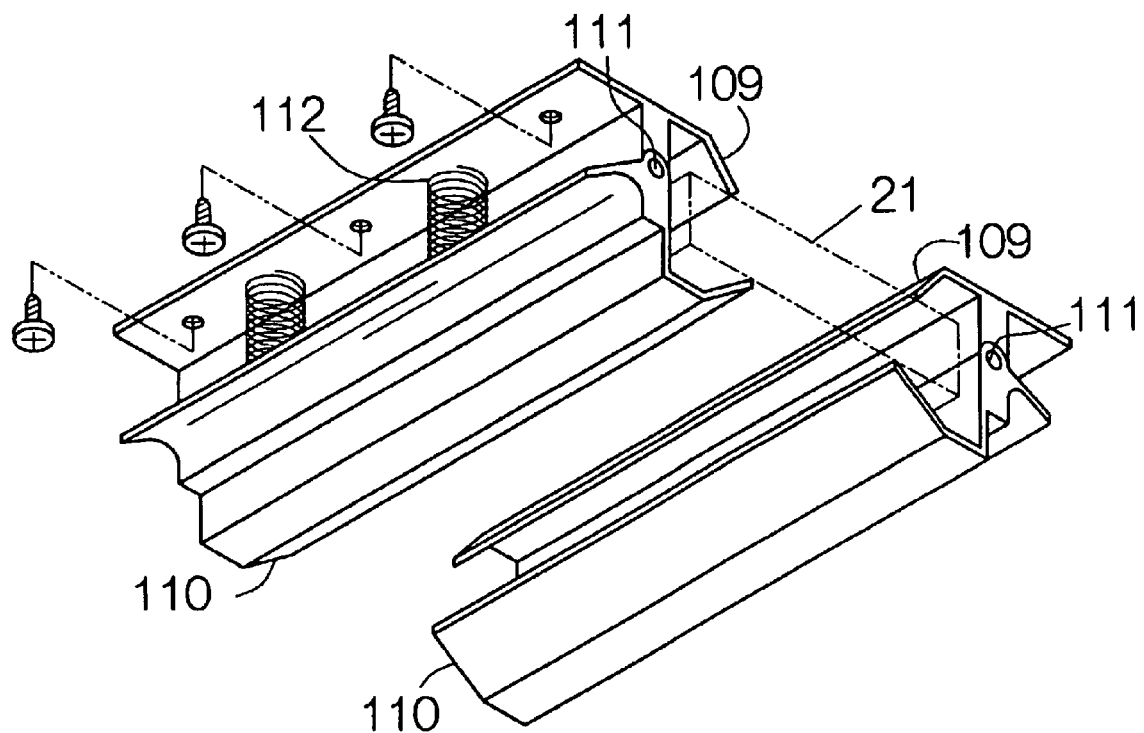
FIG. 24 is a perspective view illustrating another modification of the frame according to the second specific example.
Figure 25:
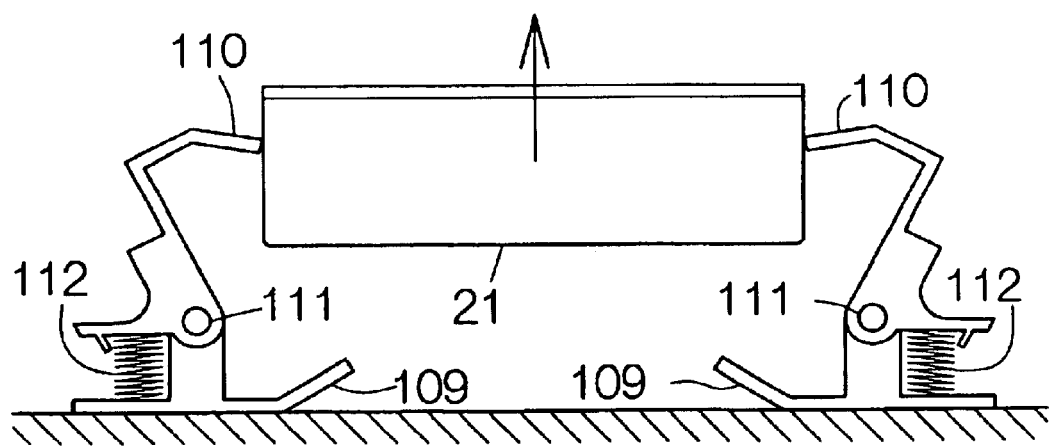
FIG. 25 is a front view schematically illustrating the action of the frame shown in FIG. 24.

As shown in FIG. 24, a shaft 111 extending in the back-and-forth direction of the HDD 21 may be employed to connect the bending portions 108 to the elastic plates 105, respectively, as well as the flat plates 109, 110 to each other in the frame 101, for example. The interposition of the shaft 111 allows the hinging movement of the flat plates 110 around the shaft 111 relative to the corresponding flat plates 109, for example. The HDD 21 can thus be removed or released out of the frame 101 in a facilitated manner, as shown in FIG. 25. A resilient member such as a spring 112 may be employed to urge the flat plates 109, 110 in the direction to approach each other so as to stably hold the HDD 21 between the flat plates 109, 110.

Figure 26:
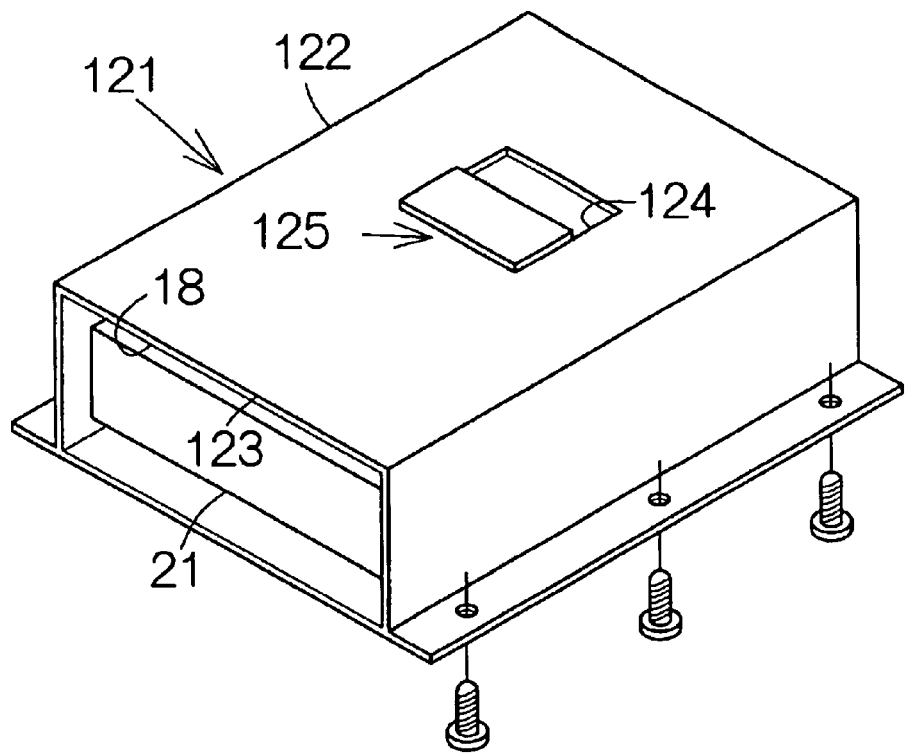
FIG. 26 is a perspective view schematically illustrating the structure of a frame according to a third specific example.

As shown in FIG. 26, a frame 121 according to a third specific example may be employed to support the HDD 21 in the inner space 18 in the notebook personal computer 81, for example. The frame 121 includes a box-shaped body 122 assembled within the enclosure body 19 so as to define the inner space 18 inside. Screws may be employed to fix the box-shaped body 122 to the enclosure body 19, for example. When the box-shaped body 122 is fixed to the enclosure body 19 in this manner, a connecting plate, namely, the top or upper plate 123 of the box-shaped body 122 is stationarily supported within the inner space 18. An opening 124 is defined in the top plate 123 of the box-shaped body 122.

Figure 27:
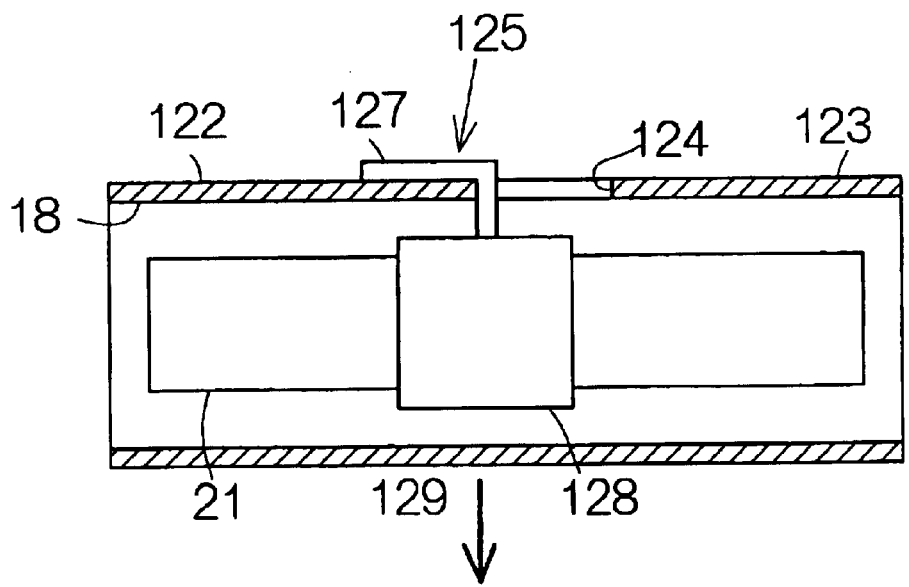
FIG. 27 is a side view of the frame along with a partial sectional view for schematically illustrating the structure of a suspended member.

A suspended member 125 is engaged with the edge of the top plate 123 around the opening 124. The suspended member 125 is suspended in the direction of gravity within the inner space 18. As is apparent from FIG. 27, the suspended member 125 includes a hook 127 and a carrying frame 128 continuous to the hook 127. The carrying frame 128 is disposed within the box-shaped body 122. The hook 127 is designed to extend from the carrying frame 128 so as to protrude out of the opening 124. The hook 127 is engaged with the exterior surface of the top plate 123. When the HDD 21 set in the carrying frame 128 within the box-shaped body 122, the HDD 21 is suspended in the direction of gravity within the inner space 18. The HDD 21 is thus supported in a floating manner in the inner space 18. The box-shaped body 122 may be made from a metallic plate such as an aluminum or copper plate, for example. The suspended member 125 may be made by molding from a hard plastic material, for example.

Figure 28:
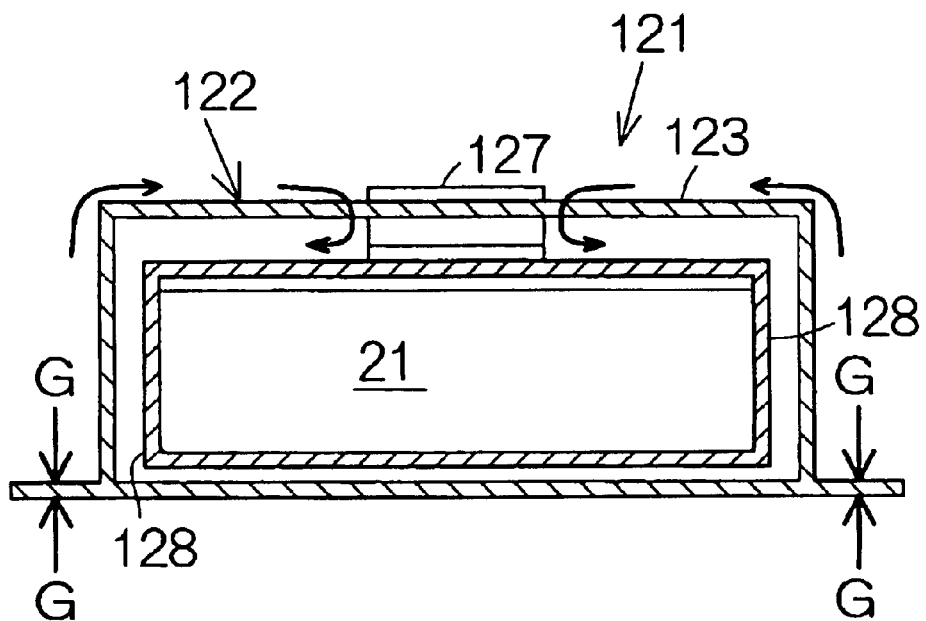
FIG. 28 is a front view schematically illustrating the action of the frame according to the third specific example.

When a larger impact G is applied to the enclosure 17 upon drop of the notebook personal computer 81 onto the ground or else from a higher elevation, the impact G is transmitted to the HDD 21 from the box-shaped body 122 via the hook 127 over a longer path in the frame 121, as shown in FIG. 28. The longer path of the transmission thus allows the impact G to attenuate before it reaches the HDD 21. The HDD 21 is prevented from receiving the larger impact G. The HDD 21 can sufficiently be protected from the larger impact G.

It is not necessary to stationarily fix the hook 127 to the top plate 123 of the frame 121. If the hook 127 enables a swinging movement of the carrying frame 128, the impact G can be transformed into the kinetic energy. The energy of the impact can be consumed in a still efficient manner. The HDD 21 is thus still reliably protected from the larger impact G.

Figure 29:
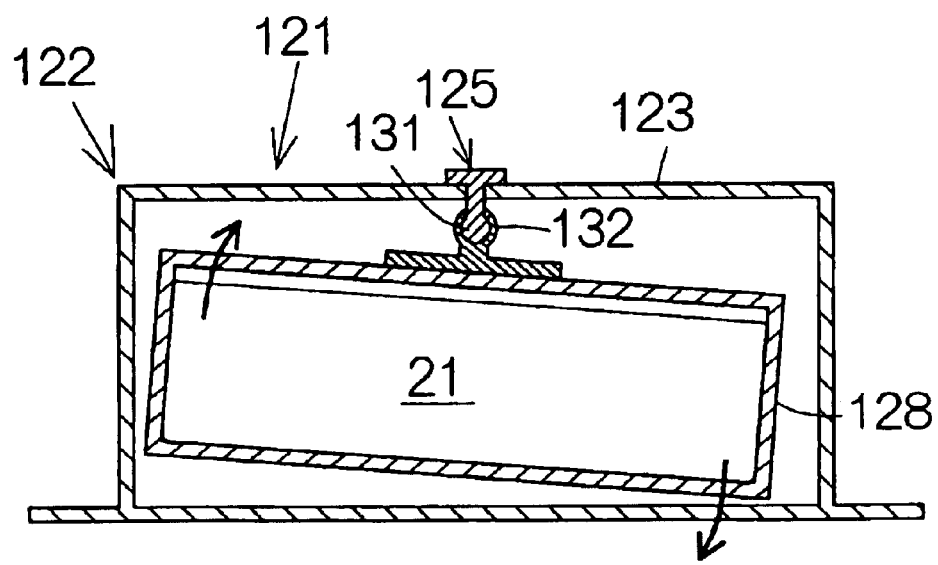
FIG. 29 is a front view illustrating a modification to the third specific example.

As shown in FIG. 29, the suspended member 125 may be constructed as a spherical pendulum, for example. In this case, the frame 121 is designed to include a spherical member 131 fixed to the top plate 123 of the box-shaped body 122, and a hollow spherical holder 132 integral to the carrying frame 128 so as to receive the spherical member 131 inside. The spherical member 131 and the hollow spherical holder 132 may be made by molding from a hard plastic material, for example.

Figure 30:
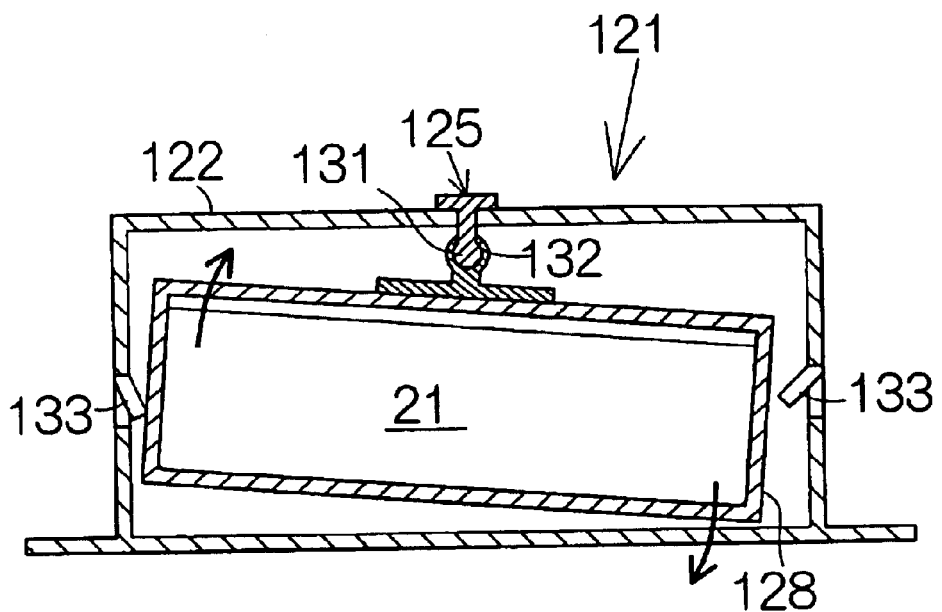
FIG. 30 is a front view illustrating another modification to the third specific example.
Figure 31:
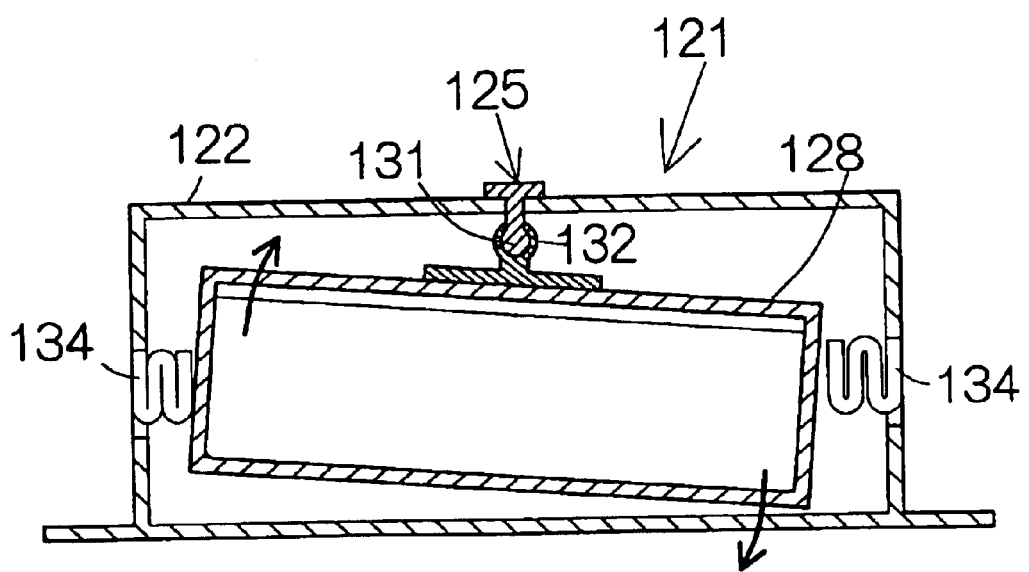
FIG. 31 is a front view illustrating a further modification to the third specific example.

In addition, when the spherical pendulum is intended in the above-described manner, elastic receiving plates 133 may be formed on the inner surface of the box-shaped body 122, as shown in FIG. 30. The elastic receiving plate 133 is designed to intersect the exterior surface of the HDD 21 at a predetermined inclined angle. The elastic receiving plates 133 may be formed by cutting out and folding portions of the material for the box-shaped body 122, for example. The elastic receiving plates 133 serve to relieve the collision of the HDD 21 against the box-shaped body 122 even when the HDD 21 swings in a larger stroke or amplitude within the box-shaped body 122. As shown in FIG. 31, elastic spring members 134 may take the place of the elastic receiving plates 133 on the inner surface of the box-shaped body 122.

Figure 32:
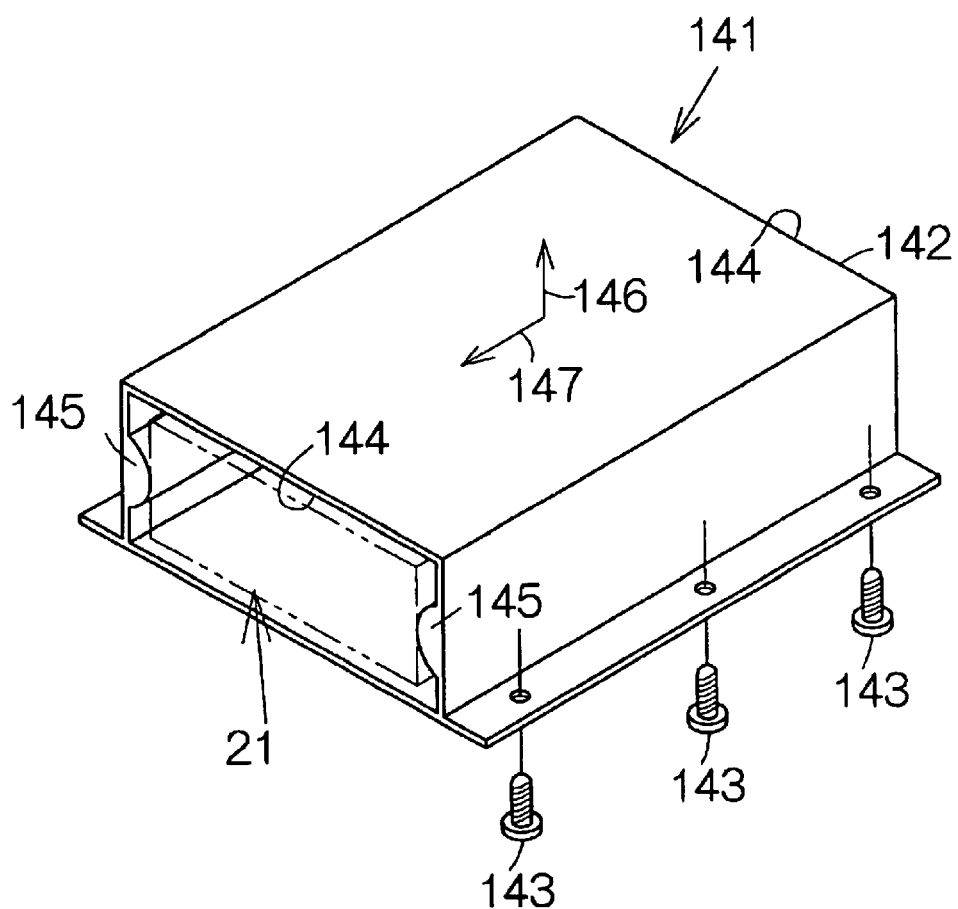
FIG. 32 is a perspective view schematically illustrating the structure of a frame according to a fourth specific example.

Furthermore, a frame 141 according to a fourth specific example may be employed to support the HDD 21 in the inner space 18 in the notebook personal computer 81, as shown in FIG. 32, for example. The frame 141 includes a box-shaped body or attachment member 142 incorporated within the enclosure body 19 so as to define the inner space 18 inside. Screws 143 may be employed to fix the box-shaped body 142 to the enclosure body 19, for example. A pair of openings 144 are defined in the box-shaped body 142. The openings 144 allow insertion and removal of the HDD 21 into and out of the box-shaped body 142 along the back-and-forth direction of the HDD 21.

A pair of rails 145 are formed on the box-shaped body 142 so as to swell from the opposed inner surfaces of the box-shaped body 142, respectively. The rails 145 are designed to extend from one opening 144 to the other opening 144. The rails 145 serve to define curved or swelling surfaces for interposing the occupation space for the HDD 21 in the horizontal direction, for example. The individual rail 145 is allowed to contact the HDD 21 along a straight line. A linear contact is established between the rail 145 and the HDD 21. The HDD 21 is thus supported between the rails 145 in a floating manner.

Figure 33:
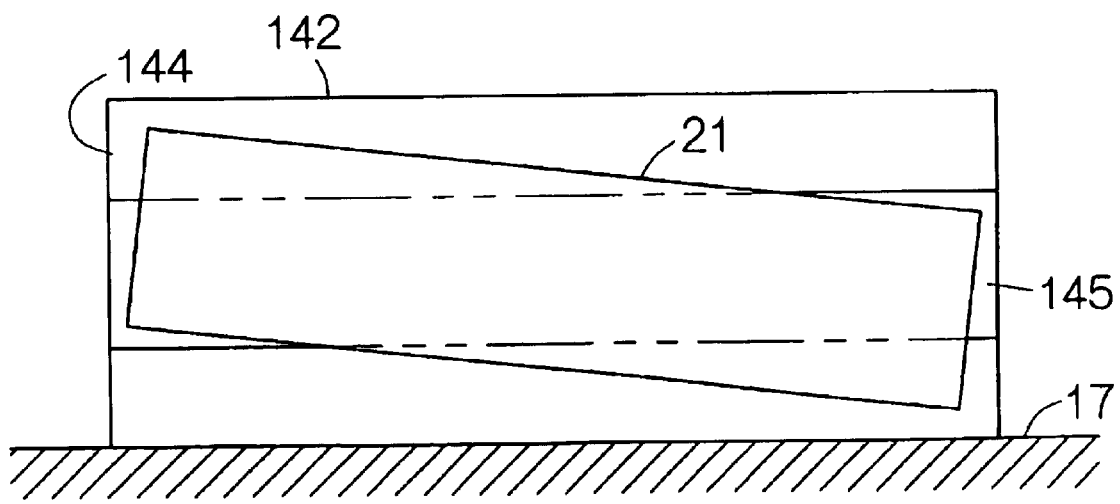
FIG. 33 is a side view of the frame along with a partial sectional view for schematically illustrating the operation of the frame according to the fourth specific example.

The combination of the rails 145 serve to restrict the movement of the HDD 21 within a plane which is defined by the vertical direction 146 and the back-and-forth direction 147 of the HDD 21. Here, when a larger impact G is applied to the enclosure 17 upon drop of the notebook personal computer 81 to the ground or else from a higher elevation, the HDD 21 is allowed to move along the plane in the box-shaped body 142, as shown in FIG. 33, for example. The energy of the impact G is transformed into the kinetic energy. The impact energy is thus sufficiently consumed in this manner. Specifically, the HDD 21 is prevented from receiving the larger impact G. The HDD 21 can sufficiently be protected from the larger impact G.

Figure 34:
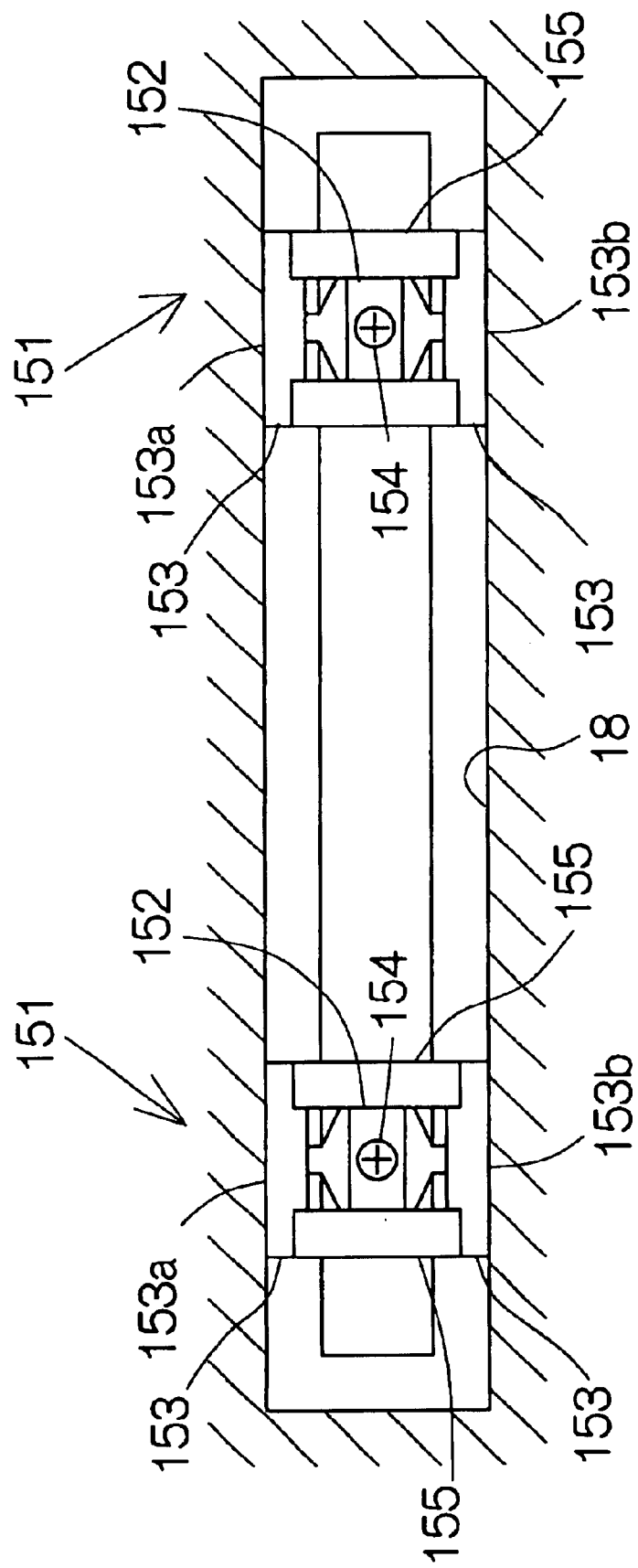
FIG. 34 is a side view of the HDD along with shock absorbing units.

Furthermore, a shock absorbing unit 151 may be employed to support the HDD 21 within the inner space 18 in the notebook personal computer 81, in place of the aforementioned frames 82, 101, 121, 141, as shown in FIG. 34, for example. The shock absorbing unit 151 includes urging elements or contact members 152 fixedly attached to the HDD 21 at the opposite sides in the horizontal direction, respectively, and pairs of upper and lower receiving members 153, 153 designed to interpose the corresponding urging elements 152 therebetween, respectively, in the vertical direction. The urging elements 152 are detachably fixed to the vertical surface or peripheral side wall of the HDD 21 by screws 154, for example. The upward and downward horizontal surfaces 153a, 153b of the receiving members 153 are received on the wall defining the inner space 18. A spacer or connecting member 155 is interposed between the upper and lower receiving members 153, 153 so as to couple the receiving members 153, 153. The spacer 155 is designed to guide the vertical movement of the urging element 152. The spacer 155 serves to keep a predetermined space between the upper and lower receiving members 153, 153 when the shock absorbing unit 151 is assembled between the walls defining the inner space 18, namely, between the enclosure body 19 and the cover 22, for example.

Figure 35:
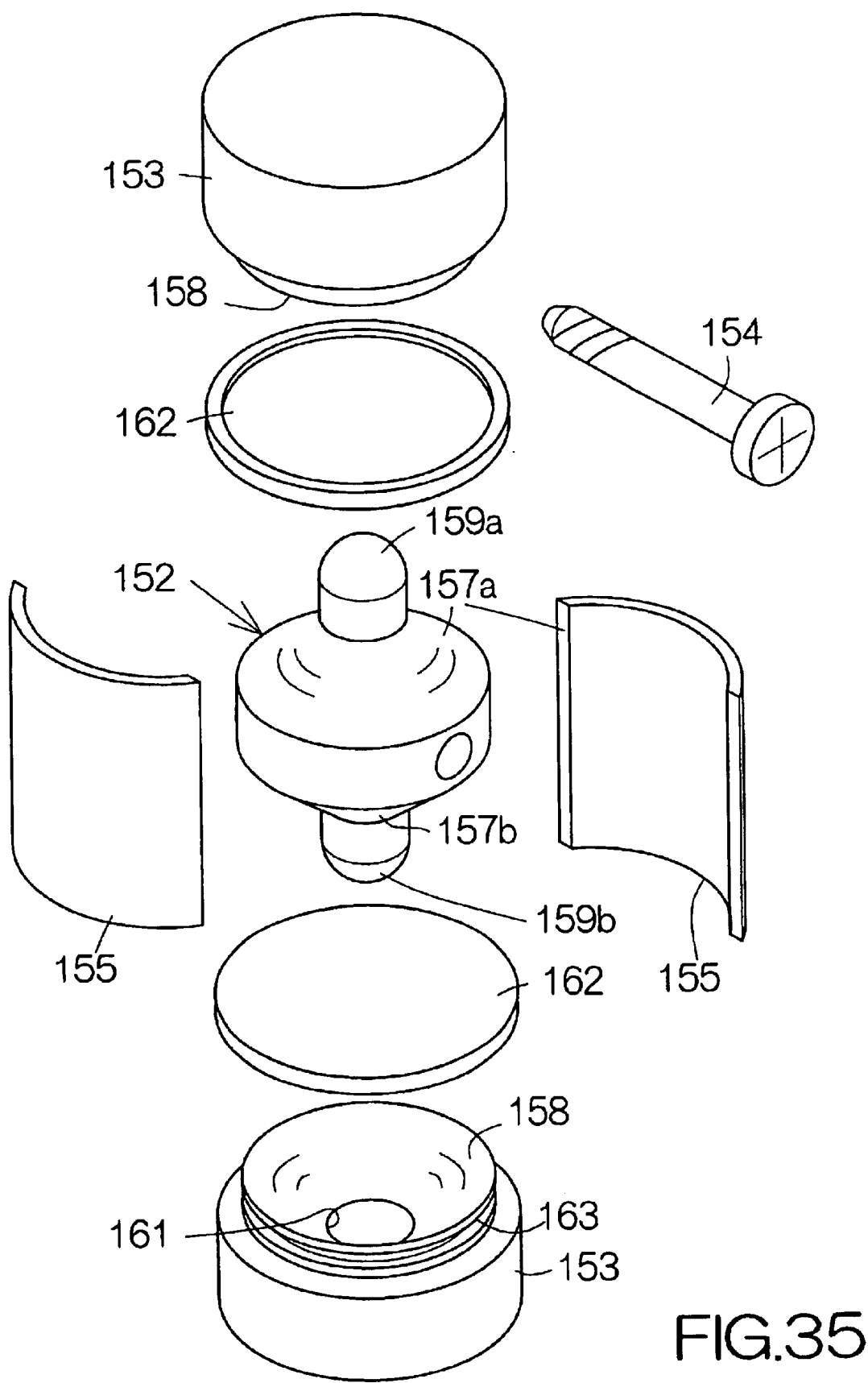
FIG. 35 is an exploded perspective view schematically illustrating the structure of the shock absorbing unit.

As is apparent from FIG. 35, upward and downward tapered ends 157a, 157b are formed on the urging element 152. A void or bowl-shaped depression 158 is formed on the upper and lower receiving members 153, 153, respectively. The depressions 158, 158 are opposed to the corresponding tapered ends 157a, 157b. When the urging element 152 is completely received on the receiving member 153 in response to the vertical movement of the urging element 152, the tapered end 157a, 157b is allowed to contact the surface of the depression 158, 158 over a broader area.

Pin-shaped protrusions 159a, 159b are integrally formed on the tips of the tapered ends 157a, 157b, respectively. On the other hand, an escape hole 161 is formed in the receiving member 153 at the bottom of the depression 158. When the tapered end 157a, 157b is completely received in the corresponding depression 158, the protrusion 159a, 159b is allowed to enter the corresponding escape hole 161.

An elastic sheet 162 is disposed between the protrusion 159a, 159b and the corresponding depression 158. The outer periphery of the elastic sheet 162 is fixed to the edge around the depression 158, for example. In this case, the outer periphery of the elastic sheet 162 may be fitted into an annular groove 163 defined over the outer peripheral surface of the receiving member 153. The elastic sheet 162 is tensioned. The tensioned elastic sheet 162 may contact the inside surface of the depression 158 in some cases. The elastic sheet 162 may be made of a soft rubber or the like.

Figure 36:
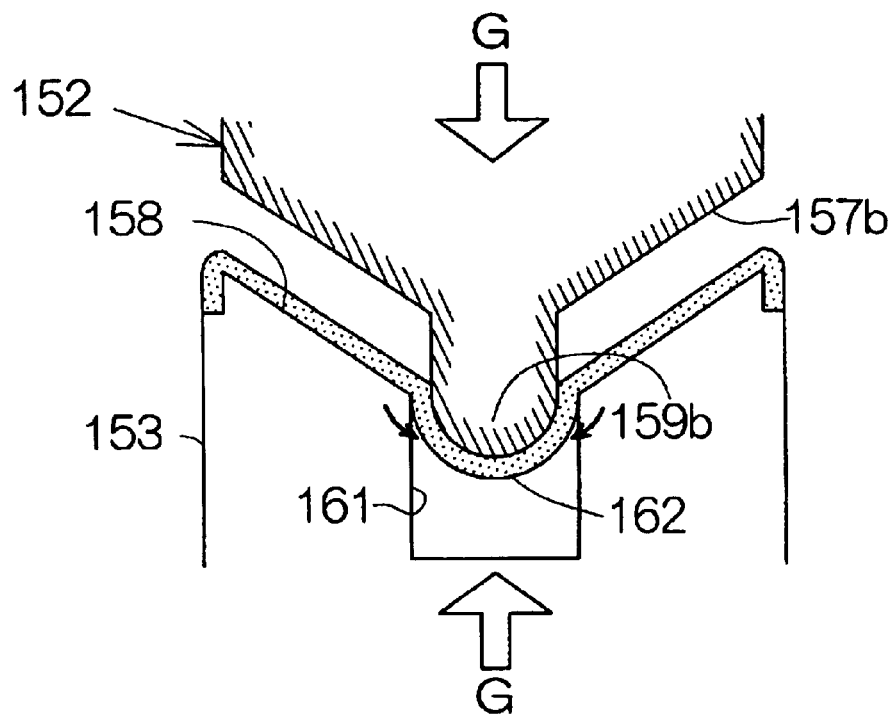

For example, when a relatively small impact G is applied to the shock absorbing unit 151 in the vertical direction, the elastic sheet 162 is allowed to receive the advancement of the protrusion 159a, 159b into the escape hole 161, as shown in FIG. 36. The elastic sheet 162 is thus stretched. The stretch of the elastic sheet 162 serves to transform the energy of the impact G into the energy of an elastic deformation. The impact energy is thus sufficiently consumed in the elastic sheet 162. Specifically, the HDD 21 is prevented from receiving the small impact G. The HDD 21 can in this manner be protected from the relatively small impact G.

Figure 37:
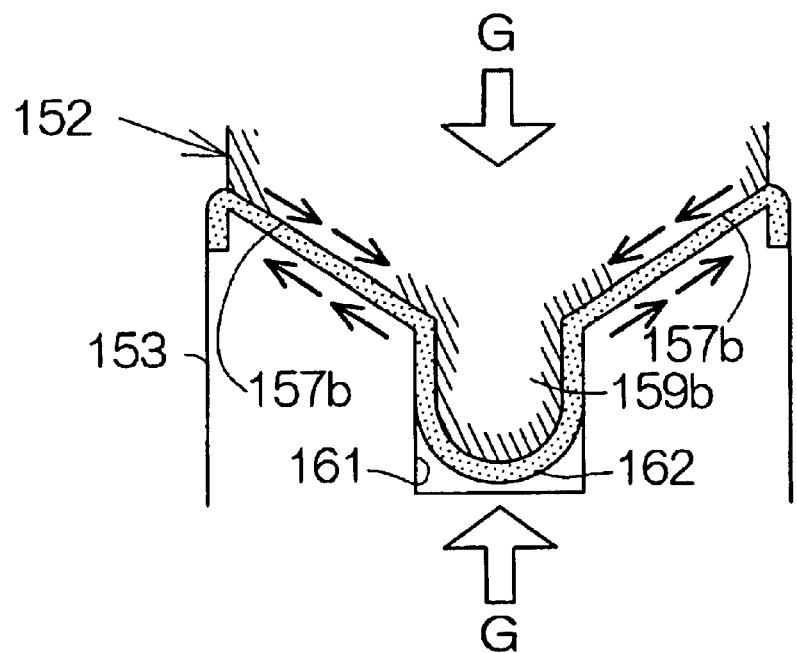

When a relatively large impact G is applied to the shock absorbing unit 151 in the vertical direction, the protrusion 159a, 159b is allowed to fully enter the escape hole 161, as shown in FIG. 37. The tapered end 157a, 157b of the urging element 152 is then received on the inside surface of the depression 158. The elastic sheet 162 is tightly held between the tapered end 157a, 157b and the inside surface of the depression 158. The elastic sheet 162 is allowed to establish a compressive deformation. The compressive deformation allows a full consumption of the impact energy. In this case, the tapered end 157a, 157b serves to simultaneously induce a shearing stress in the elastic sheet 162. The consumption of the impact energy is thus promoted. The HDD 21 can sufficiently be protected from the relatively large impact G in this manner.

Figure 38:
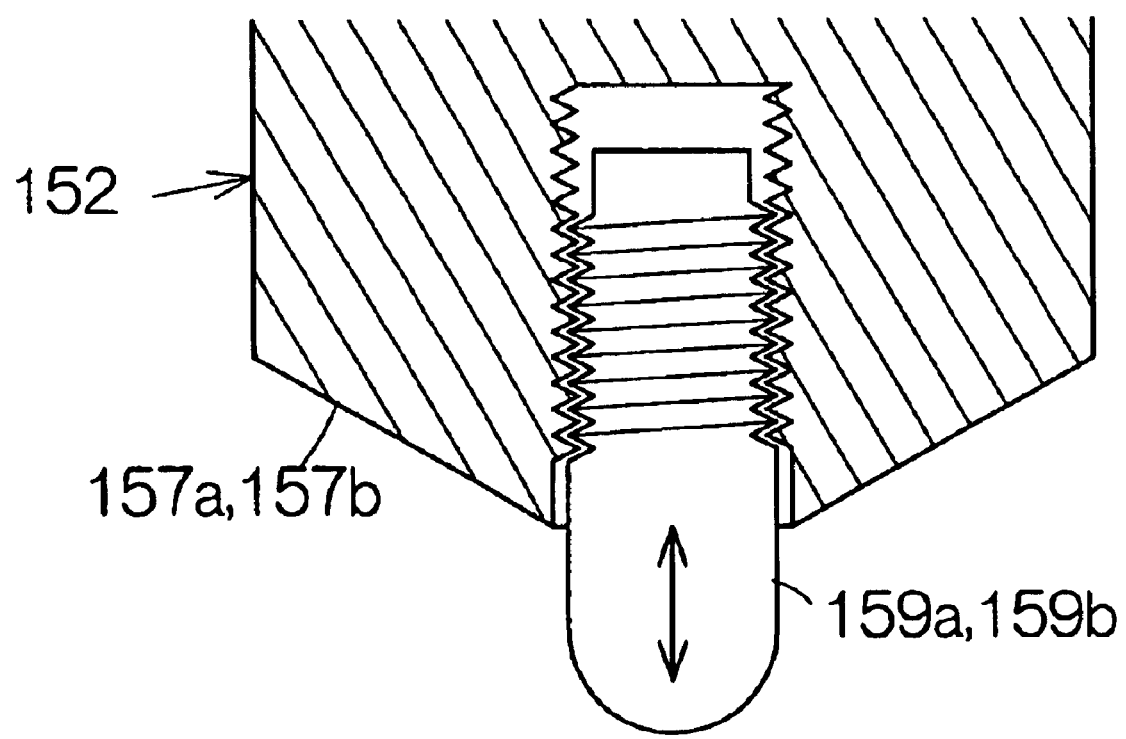
FIG. 38 is a sectional view illustrating a protrusion screwed into the tip of a tapered end.

As shown in FIG. 38, the individual protrusion 159a, 159b may be screwed into the tip of the tapered end 157a, 157b in the shock absorbing unit 151, for example. The screwed protrusion 159a, 159b in this manner enables a displacement of the protrusion 159a, 159b relative to the tapered end 157a, 157b in the axial direction in response to the amount of rotation. Such a displacement enables adjustment of the protruded amount of the protrusion 159a, 159b. It is thus possible to control the magnitude of an impact G absorbed by the stretch of the elastic sheet 162 prior to the compressive deformation.

Figure 39:
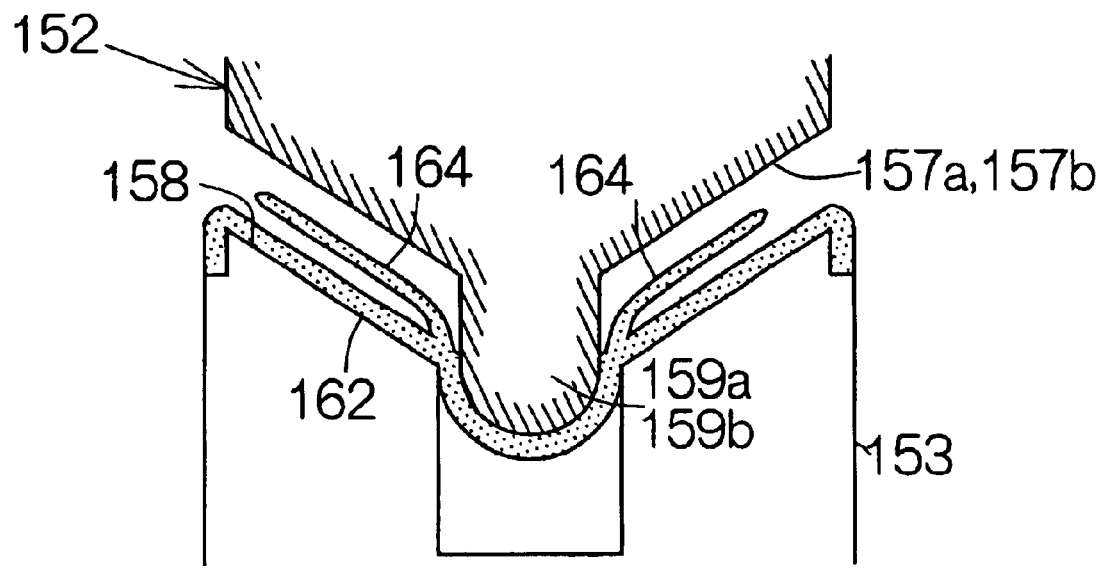
FIG. 39 schematically illustrates the structure of a shock absorbing unit according to a modification.

In addition, an auxiliary elastic sheet 164 may be added to the elastic sheet 162 covering over the inside surface of the depression 158 in the shock absorbing unit 151, as shown in FIG. 39, for example. The auxiliary elastic sheet 164 is also held between the tapered end 157a, 157b and the corresponding depression 158. The auxiliary elastic sheet 164 cooperates with the elastic sheet 162 in absorbing an impact. It is thus possible to control the magnitude of an impact G absorbed by the compressive and/or shearing deformation in the aforementioned manner.

Figure 40:
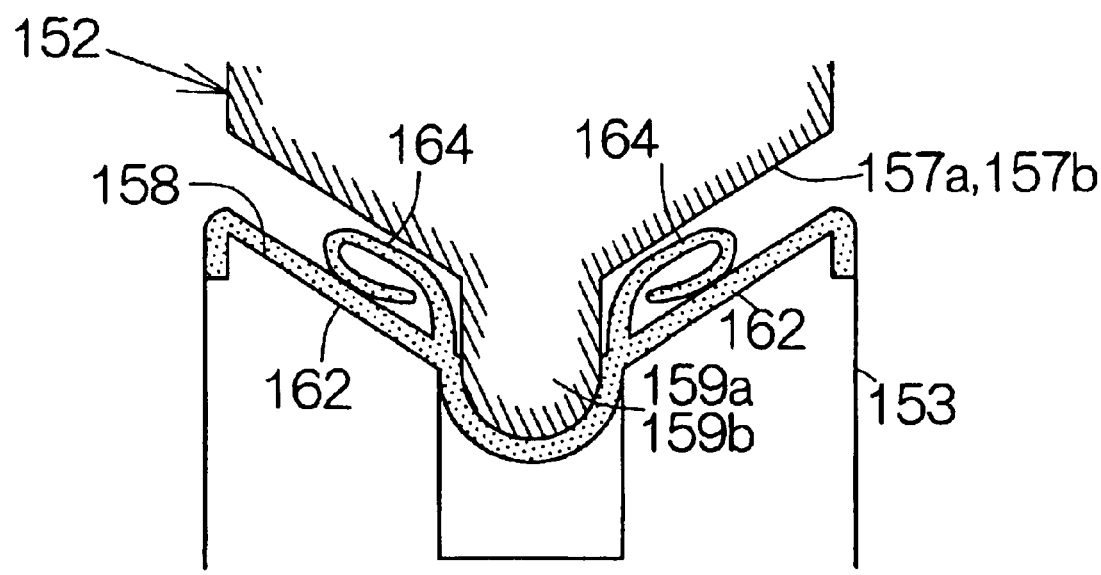
FIG. 40 schematically illustrates the operation of the shock absorbing unit shown in FIG. 39.

In particular, the auxiliary elastic sheet 164 preferably includes a through hole through which the protrusion 159a, 159b is allowed to penetrate. If the auxiliary elastic sheet 164 is made continuous to the elastic sheet 162 at the edge around the through hole, the auxiliary elastic sheet 164 can be rolled to adjust the overall thickness of the elastic sheets 162, 164, as shown in FIG. 40, for example. In this manner, it is possible to still effectively control the magnitude of an impact G absorbed by the compressive and/or shearing deformation in the aforementioned manner.

Figure 41:
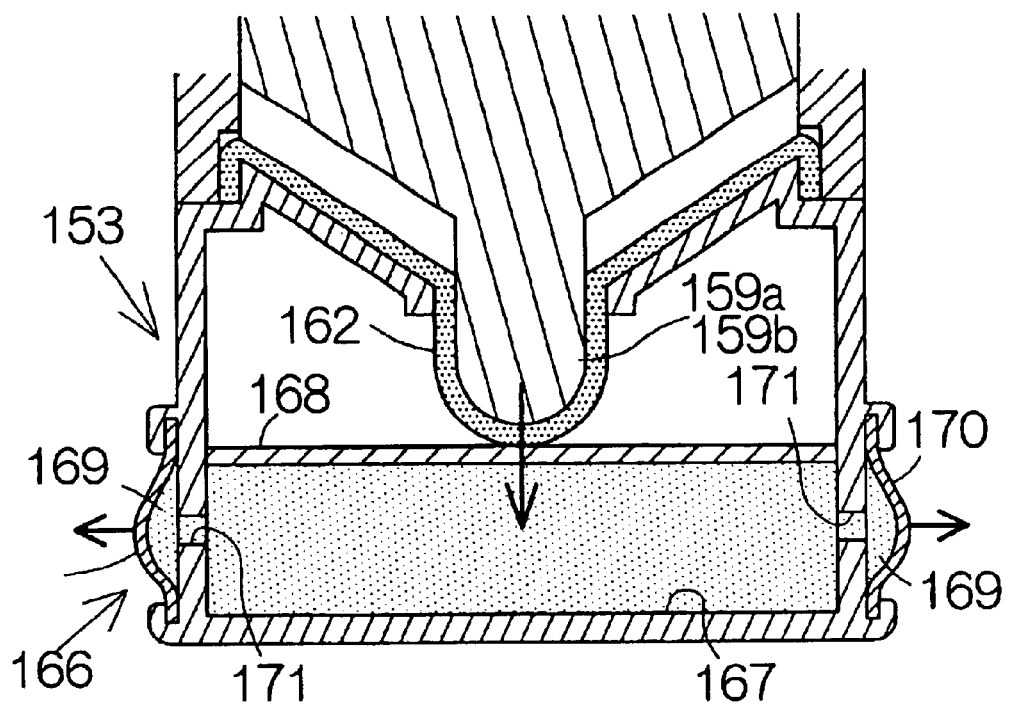
FIG. 41 schematically illustrates the structure of a shock absorbing unit according to another modification.

As shown in FIG. 41, an additional shock absorbing mechanism 166 may be incorporated in the receiving member 153 in the shock absorbing unit 151, for example. The additional shock absorbing mechanism 166 includes a piston designed to define a pressure chamber 167 within an enclosure of the receiving member 153, and a medium airtightly enclosed within the pressure chamber 167 for transmitting the pressure. Escape chambers 169 are defined outside the enclosure of the receiving member 153. An elastic film 170 is attached to the exterior surface of the enclosure so as to define the escape chamber 169. The escape chambers 169 are connected to the pressure chamber 167. An orifice 171 may be defined in a passage between the pressure chamber 167 and the escape chamber 169.

Figure 42:
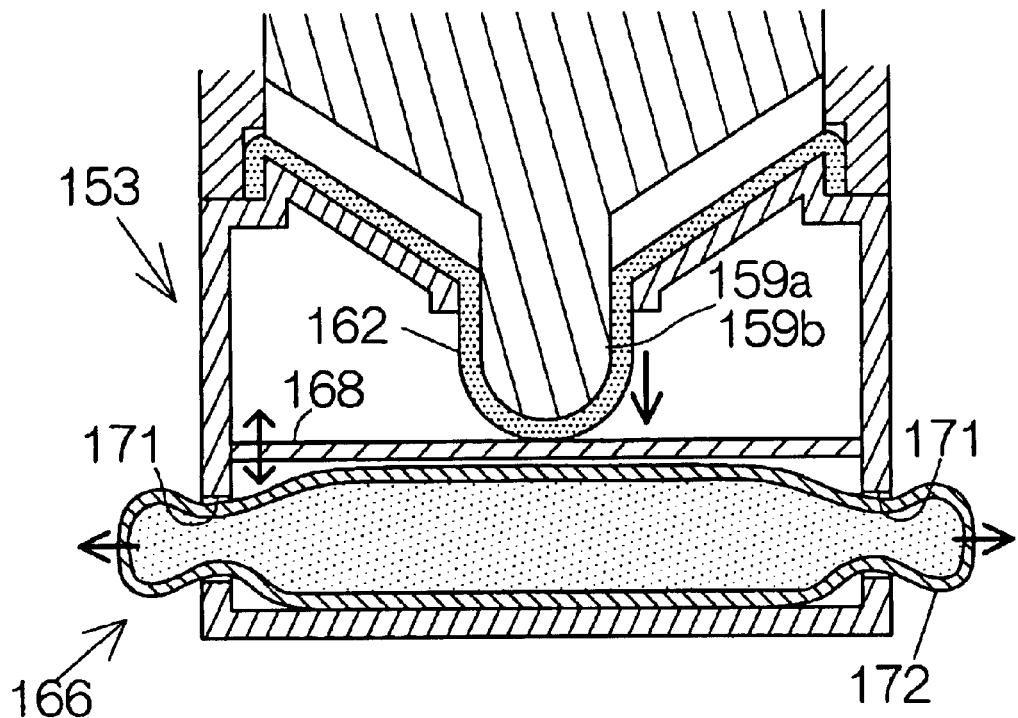
FIG. 42 schematically illustrates the structure of a shock absorbing unit according to a further modification.

When the protrusion 159a, 159b urges the piston 168 downward so as to reduce the volume of the pressure chamber 167 in the additional shock absorbing mechanism 166, the medium flows out of the pressure chamber 167 into the escape chambers 169 through the orifices 171. The orifices 171 serve to restrain the downward movement of the piston 168. The energy of the impact is thus sufficiently absorbed. When the elasticity of the elastic sheet 162 is allowed to urge the protrusion 159*a*, 159*b* upward, the elastic films 170 serve to return the medium into the pressure chamber 167. Gas such as air or liquid such as oil may be employed as the medium. As shown in FIG. 42, a common closed bag 172 may be employed to define the pressure chamber 167 and the escape chambers 169 in the additional shock absorbing mechanism 166, for example.

Figure 43:
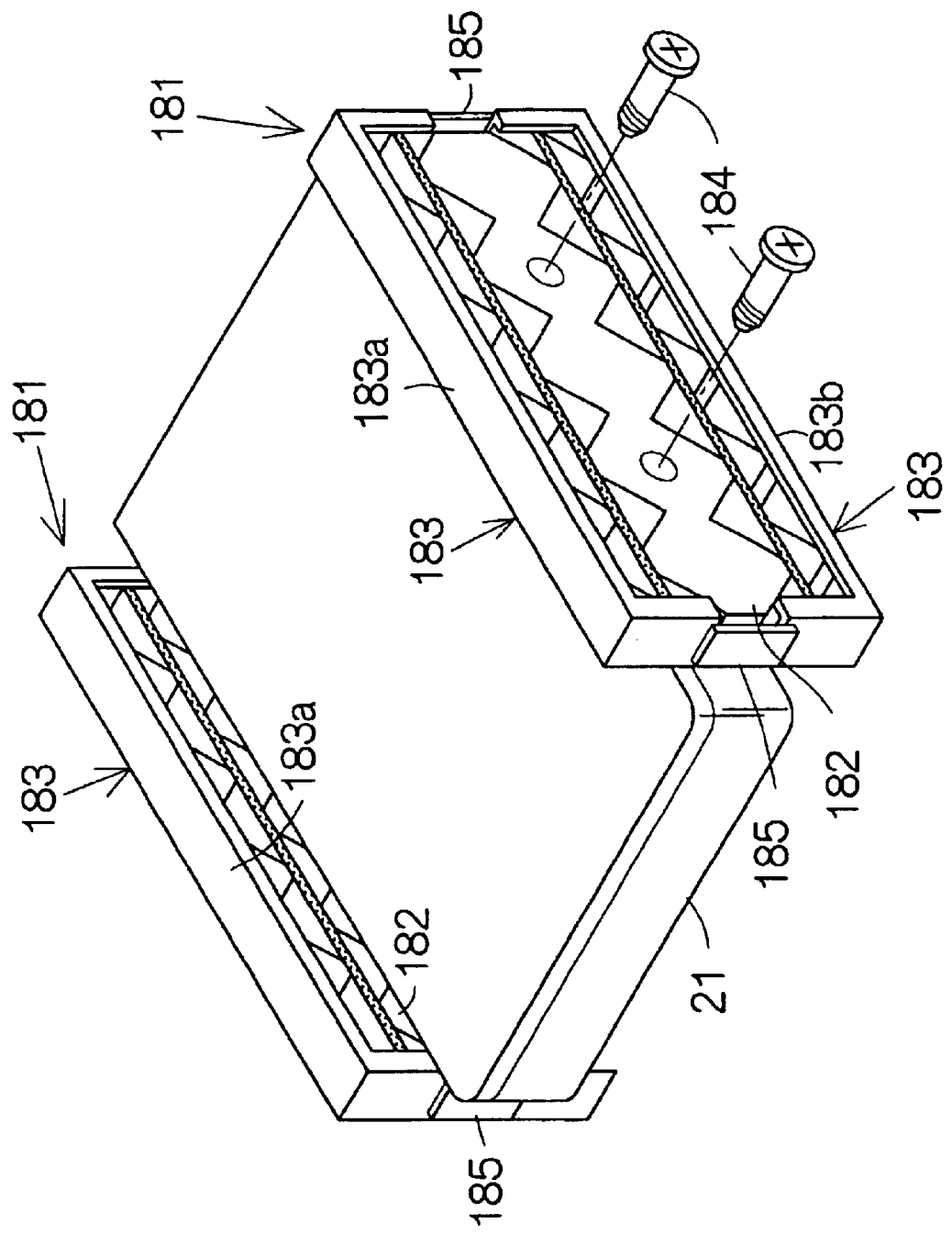
FIG. 43 is a perspective view schematically illustrating the structure of a shock absorbing unit according to another specific example.

Furthermore, a shock absorbing unit 181 may be employed to support the HDD 21 within the inner space 18 in the notebook personal computer 81, in place of the aforementioned shock absorbing unit 151, as shown in FIG. 43, for example. The shock absorbing unit 181 includes urging elements or contact members 182 fixedly attached to the HDD 21 at the opposite sides in the horizontal direction, respectively, for example, and pairs of upper and lower receiving members 183, 183 designed to interpose the corresponding urging elements 182 therebetween, respectively, in the vertical direction. The urging elements 182 are detachably fixed to the vertical surface or peripheral side wall of the HDD 21 by screws 184, for example. The upward and downward horizontal surfaces 183*a*, 183*b* of the receiving members 183 are received on the wall defining the inner space 18. A spacer or connecting member 185 is interposed between the upper and lower receiving members 183, 183 so as to couple the receiving members 183, 183. The spacer 185 is designed to guide the vertical movement of the urging element 182. The spacer 185 serves to keep a predetermined space between the upper and lower receiving members 183, 183 when the shock absorbing unit 181 is assembled between the walls defining the inner space 18, namely, between the enclosure body 19 and the cover 22, for example.

Figure 44:
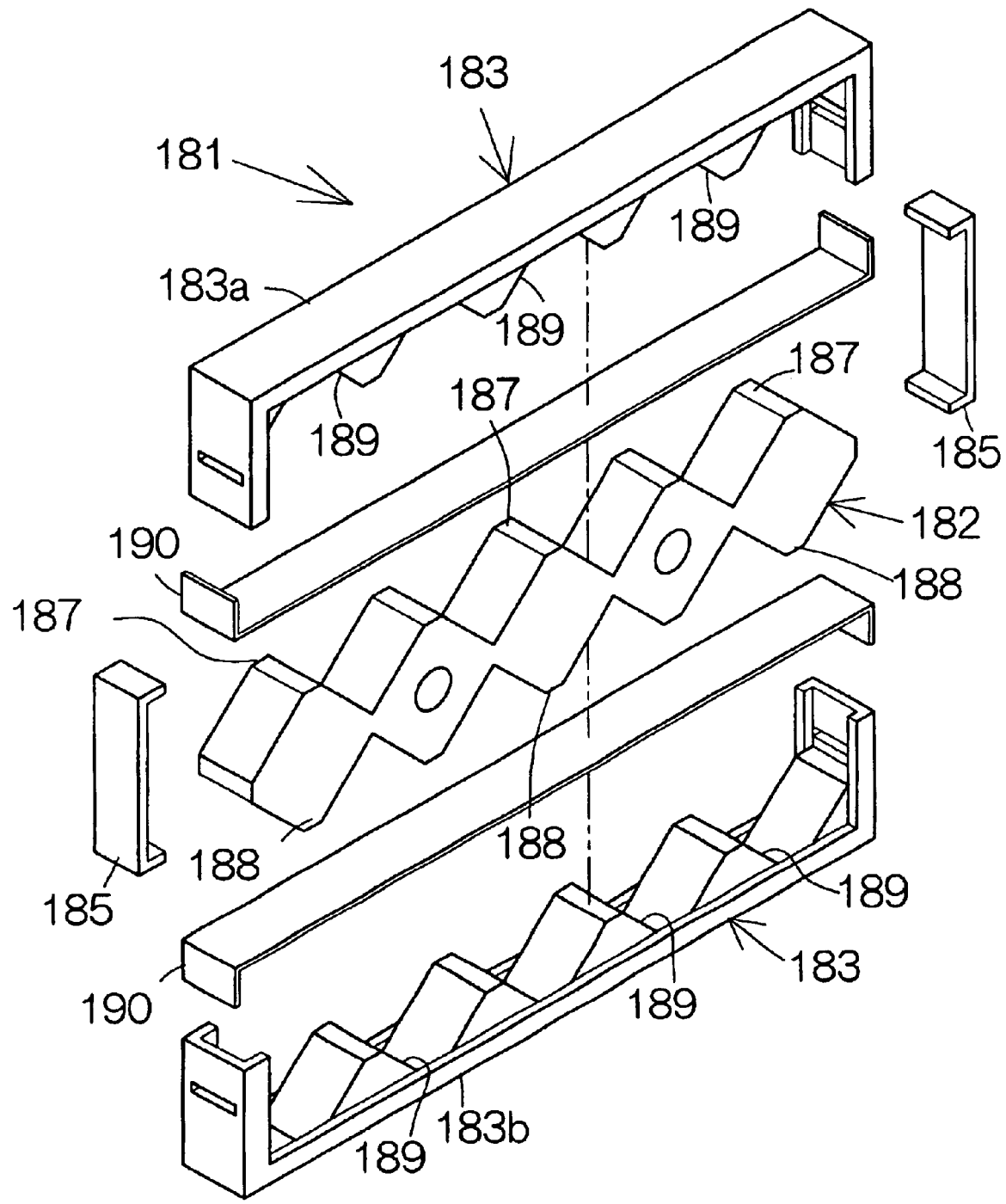
FIG. 44 is an exploded view schematically illustrating the structure of the shock absorbing unit shown in FIG. 43.

As is apparent from FIG. 44, upward and downward protrusions 187, 188 are integrally formed on the urging element 182. The upward protrusions 187 are arranged at constant intervals in the back-and-forth direction of the HDD 21. Likewise, the downward protrusions 188 are arranged at constant intervals in the back-and-forth direction of the HDD 21. On the other hand, voids or depressions 189, 189 are defined on the upper and lower receiving members 183, 183, respectively, so as to correspond to the upward and downward protrusions 187, 188. When the urging element 182 is received on the upper or lower receiving member 183, the upward or downward protrusions 187, 188 are allowed to contact the surface of the corresponding depressions 189 over a broader area.

An elastic tape 190 is disposed between the upward protrusions 187 and the corresponding depressions 189 as well as between the downward protrusions 188 and the corresponding depressions 189. The front and rear ends of the elastic tape 190 are fixed to the receiving member 183, respectively. Here, a tension is applied to the elastic tape 190 so as to prevent a slack of the elastic tape 190 enough. The elastic tape 190 may be made of a soft rubber or the like.

Figure 45:
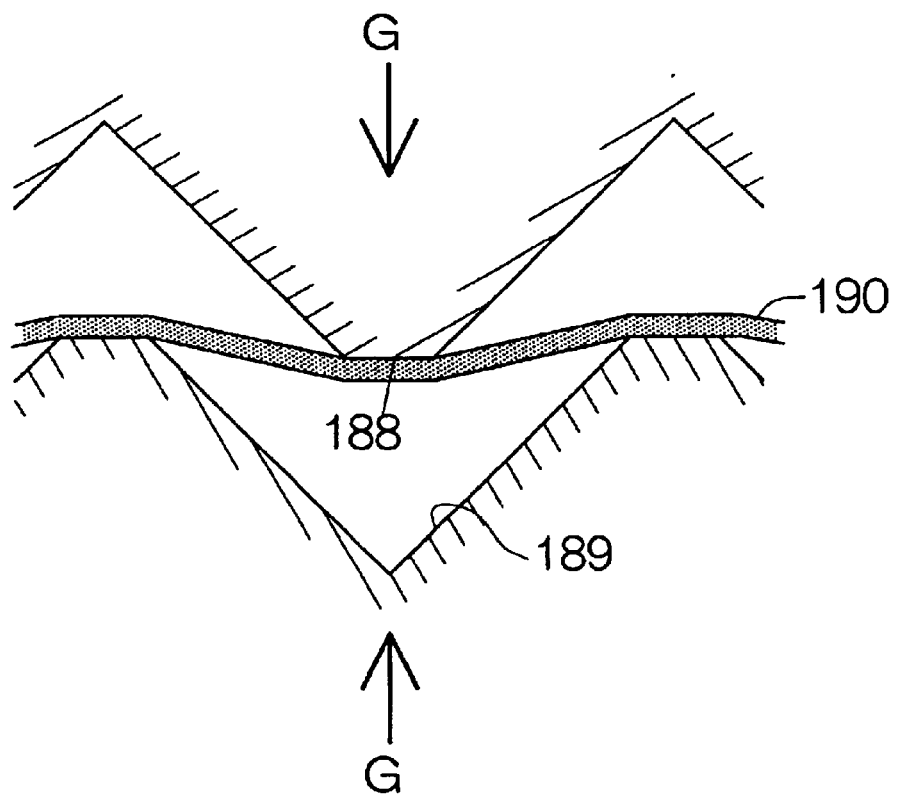

For example, when a relatively small impact G is applied to the shock absorbing unit 181 in the vertical direction, the upward movement of the upward protrusions 187 or the downward movement of the downward protrusions 188 serves to induce the stretch of the elastic tape 190 toward the depressions 189, as shown in FIG. 45. The elastic tape 190 gets elongated. The stretch of the elastic tape 190 serves to transform the energy of the impact G into the energy of an elastic deformation. The impact energy is thus sufficiently consumed in the elastic tape 190. Specifically, the HDD 21 is prevented from receiving the small impact G. The HDD 21 can in this manner be protected from the relatively small impact G.

Figure 46:
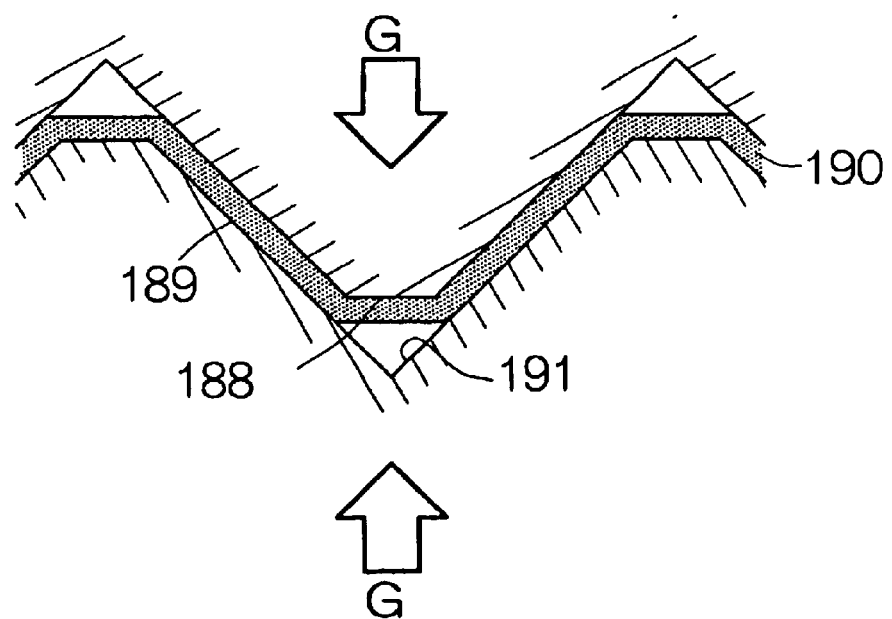

When a relatively large impact G is applied to the shock absorbing unit 181 in the vertical direction, the elastic tape 190 is tightly held between the upward or downward protrusions 187, 188 and the inside surfaces of the corresponding depressions 189, as shown in FIG. 46. The elastic tape 190 is allowed to establish a compressive deformation. The compressive deformation allows a full consumption of the impact energy. In this case, the inclined surfaces of the upward and downward protrusions 187, 188 serve to simultaneously induce a shearing deformation in the elastic tape 190. The consumption of the impact energy is thus promoted. The HDD 21 can sufficiently be protected from the relatively large impact G in this manner. It is preferable to keep a clearance 191 between the upward and downward protrusions 187, 188 and the corresponding depressions 189. Such a clearance 191 allows the expansion of the elastic tape 190 between the upward and downward protrusions 187, 188 and the depressions 189 upon the compressive deformation.

Figure 47:
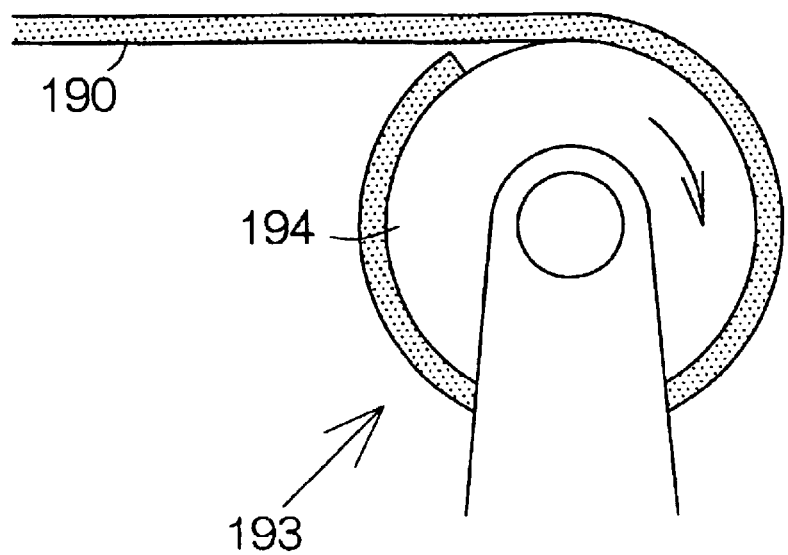
FIG. 47 is an enlarged side view schematically illustrating the structure of a tensioner mechanism added to the shock absorbing unit shown in FIG. 43.

As shown in FIG. 47, a tensioner mechanism 193 may be added to the shock absorbing unit 181 for controlling the tension of the elastic tape 190, for example. The tensioner mechanism 193 may include a roller 194 around which the elastic tape 190 is wound, for example. As the elastic tape 190 is wound around the roller 194, the tension applied to the elastic tape 190 can be increased. The rotation of the roller 194 should be restrained after the elastic tape 190 has been wound around the roller 194 at a required amount.

Figure 48:
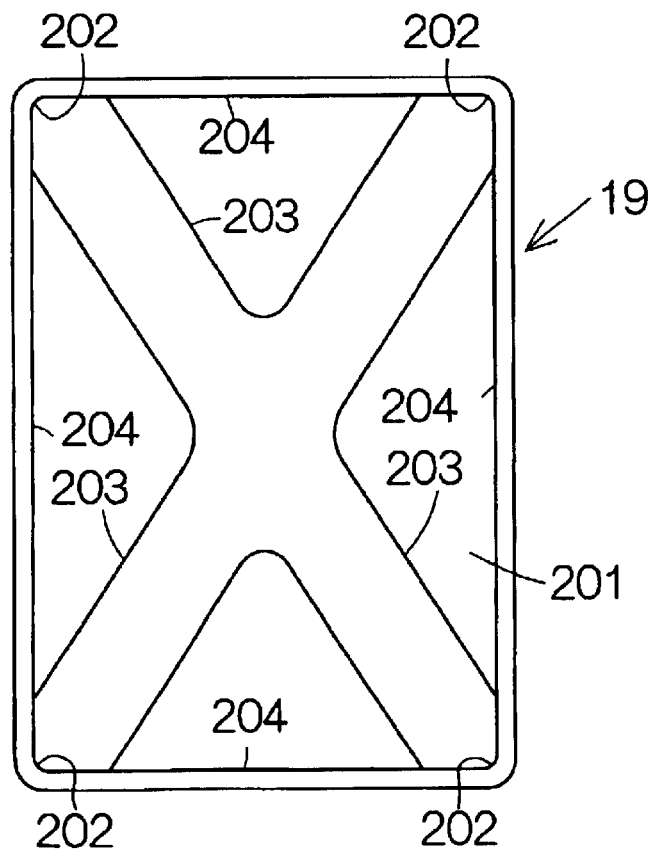
FIG. 48 is a plan view schematically illustrating the structure of a reinforcing beam incorporated within the enclosure body.

Now, the enclosure body 19 may include reinforcing beams 203 designed to connect the opposite corners 202 on the generally rectangular bottom plate 201, as shown in FIG. 48, for example. In general, the enclosure body 19 defines four side walls 204 standing on the periphery of the rectangular bottom plate 201. Four edges or ridgelines are formed at the junction of the bottom plate 201 and the side walls 204. The edges serve to reinforce the rigidity of the enclosure body 19. The combination of the edges and the reinforcing beams 203 achieves a still increased rigidity of the enclosure body 19. Flexure such as the twist of the bottom plate 201 can effectively be prevented. The reinforcing beams 203 may be formed integrally to the bottom plate 201 or separately from the bottom plate 201.

Figure 49:
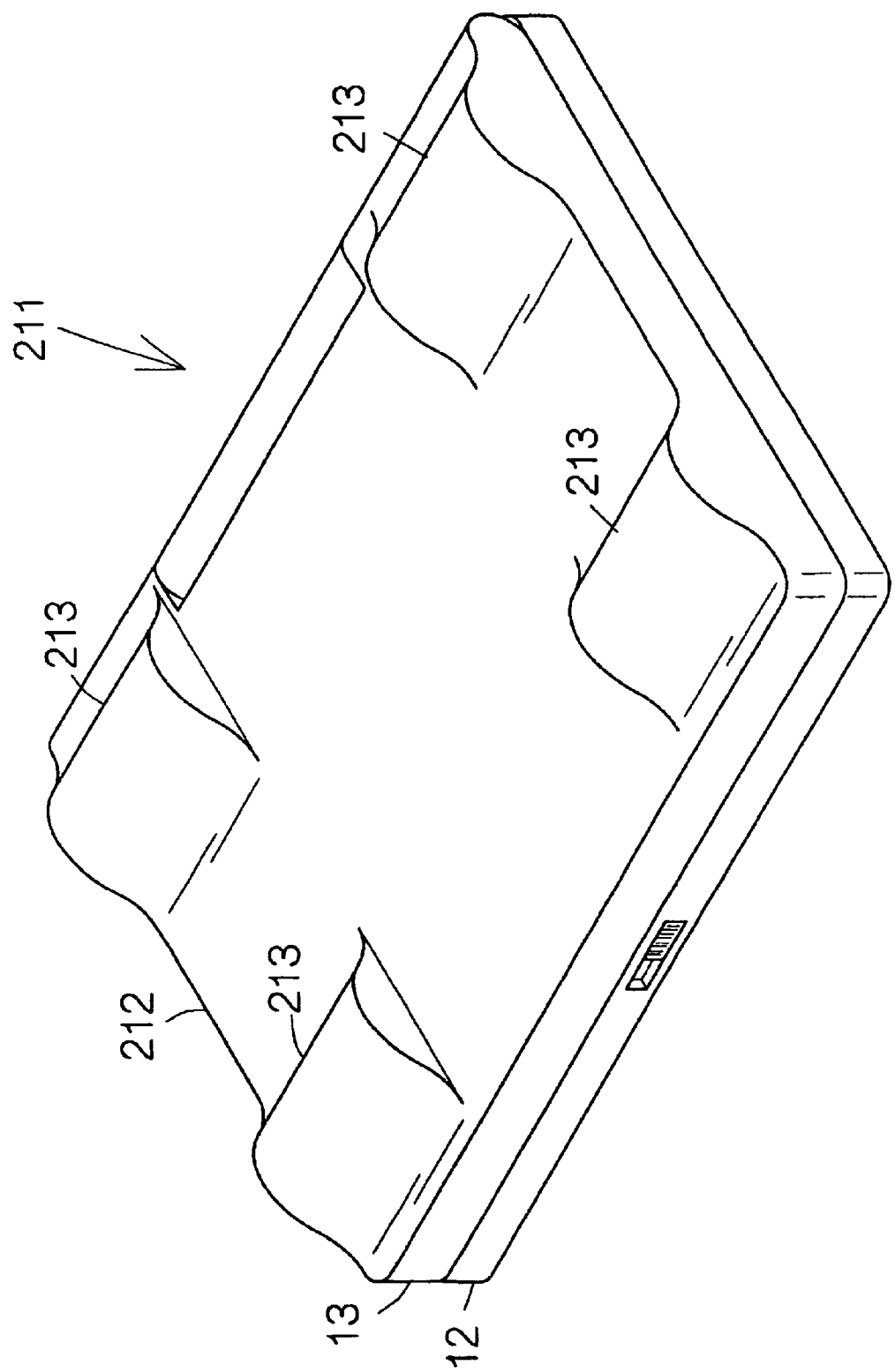
FIG. 49 is a perspective view illustrating a notebook personal computer as an electronic apparatus according to a fifth embodiment of the present invention.

FIG. 49 schematically illustrates a notebook personal computer 211 as an electronic apparatus according to fifth embodiment of the present invention. The notebook personal computer 211 includes a main body 12 as well as a display panel unit 13 in the same manner as the aforementioned first to fourth embodiments. The main body 12 is designed to contain internal components such as a motherboard and a hard disk drive (HDD) 21, for example, in the aforementioned manner. The display panel unit 13 is connected to the main body 12 for hinging or swinging movement relative to the main body 12 in the aforementioned manner. A liquid crystal display (LCD) panel module 16 is incorporated within the display panel unit 13. Referring also to FIG. 1, the display panel unit 13 can be superposed on the main body 12 so as to face the screen of the LCD panel module 16 and the keyboard 14 inside.

Figure 50:
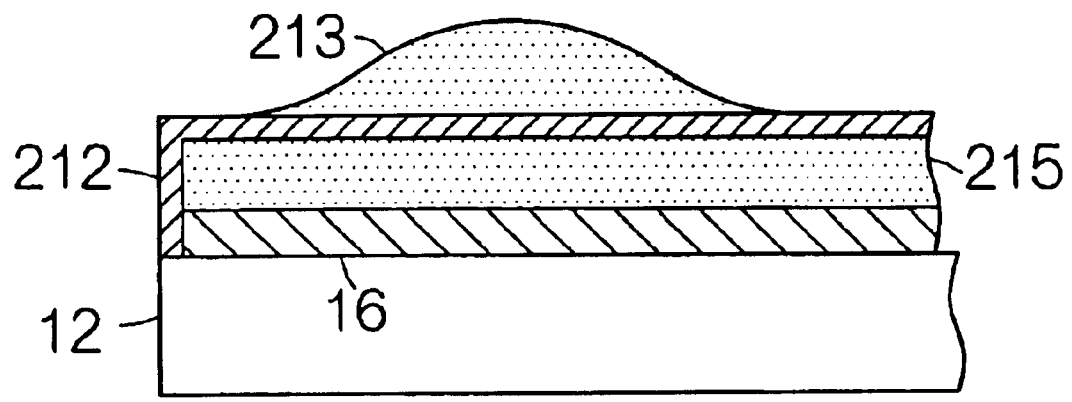
FIG. 50 is an enlarged sectional view illustrating an example of a shock absorbing member.
Figure 51:
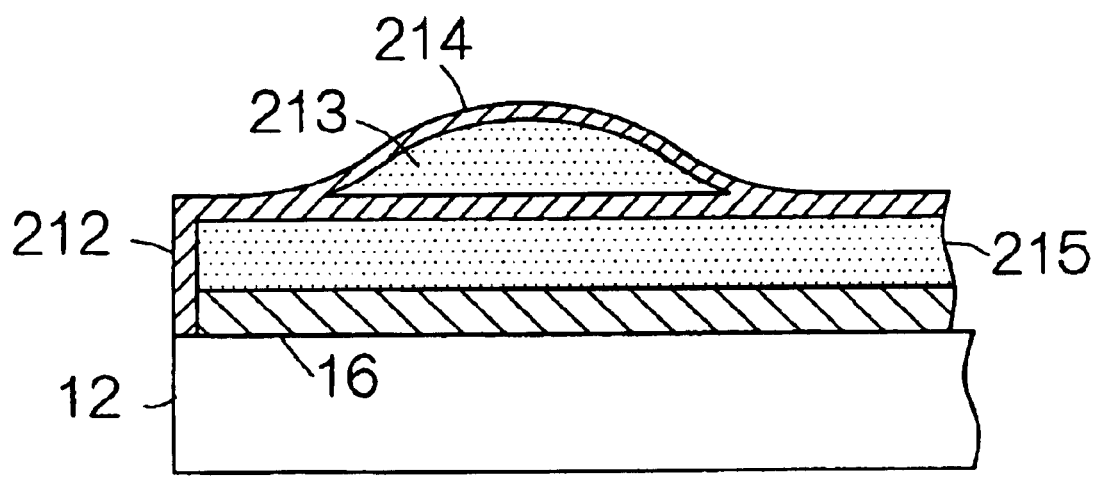
FIG. 51 is an enlarged sectional view illustrating another example of a shock absorbing member.

The display panel unit 13 includes an enclosure 212. The LCD panel module 16 is housed in the enclosure 212. Shock absorbing members 213 are fixedly received on the exterior surface of the enclosure 212 behind the backside of the LCD panel module 16. The shock absorbing member 213 is designed to swell from the exterior surface of the enclosure 212. As is apparent from FIG. 50, the shock absorbing members 213 may be adhered to the exterior surface of the enclosure 212. Otherwise, the shock absorbing members 213 are embedded under a skin layer 214 designed to cover all over the outer surface of the enclosure 212, as shown in FIG. 51, for example. The shock absorbing member 213 may be made from a soft rubber, a soft plastic, or the like. A shock absorbing elastic layer 215 may also be interposed between the enclosure 212 and the LCD panel module 16.

When the exterior surface of the enclosure 212 suffers from a larger impact upon drop of the notebook personal computer 211 to the ground or else from a higher elevation, the shock absorbing members 213 serve to sufficiently absorb the larger impact. The enclosure 212 for the LCD panel module 16 is thus prevented from receiving a larger impact. Any deformation such as flexure can sufficiently be suppressed in the enclosure 212. The LCD panel module 16 is reliably protected from a larger impact.

Figure 52:
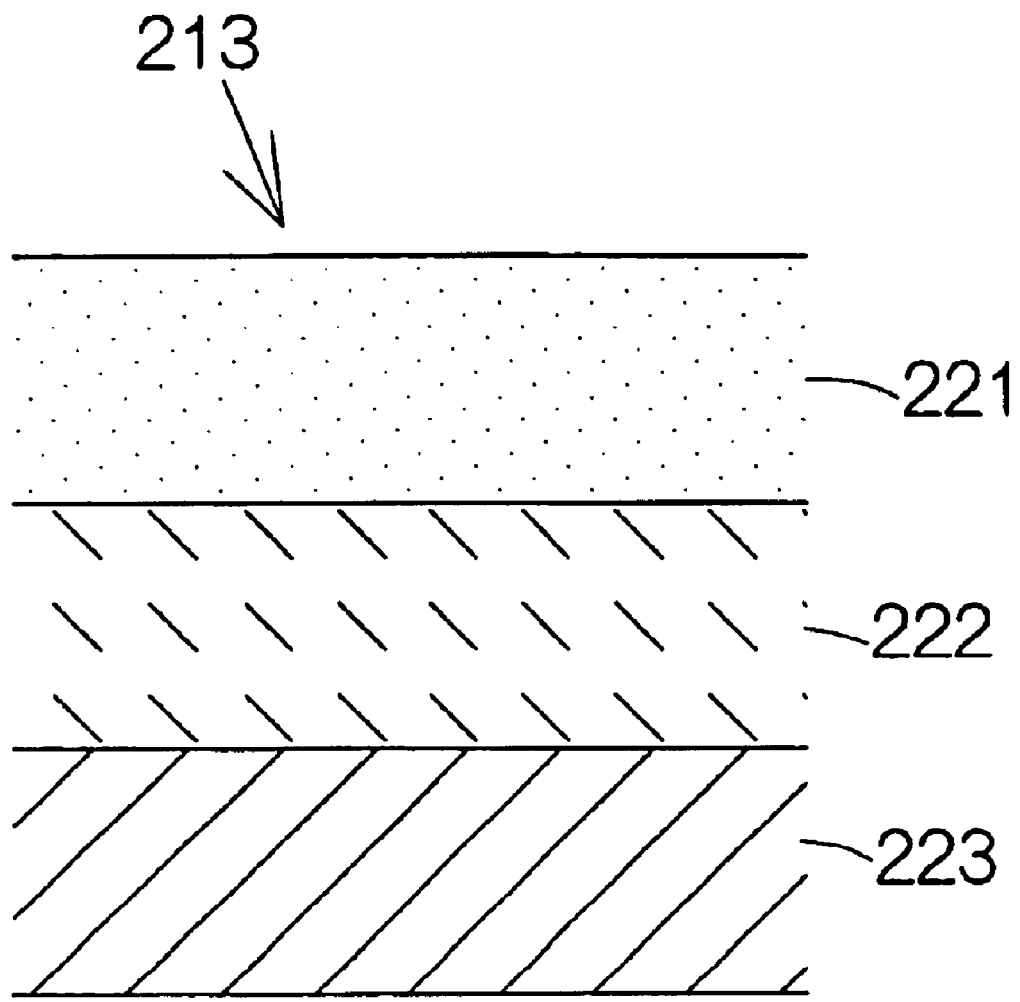
FIG. 52 is a schematic view illustrating the structure of an elastic material employed as the shock absorbing member.

As shown in FIG. 52, an elastic material for the shock absorbing member 213 may include a first layer 221 having the hardness of a first level. The first layer 221 is designed to receive a second layer 222 having the hardness of a second level smaller than the first level. Likewise, the second layer 222 is designed to receive a third layer 223 having the hardness of a third level smaller than the second level. A polyurethane material having an Asker C hardness around 50 degrees may be employed to form the first layer 221, for example. The first layer 221 of 50 degrees Asker C hardness serves to effectively absorb the impact ranging between approximately 600 G–900 G. A styrene rubber having an Asker C hardness around 40 degrees may be employed to form the second layer 222, for example. The second layer 222 of 40 degrees Asker C hardness serves to effectively absorb the impact ranging between approximately 300 G–600 G. A polyurethane foam having an Asker C hardness around 30 degrees may be employed to form the third layer 223, for example. The third layer 223 of 30 degrees Asker C hardness serves to effectively absorb the impact ranging between approximately 100 G–300 G. The elastic material of this type thus enables a reliable absorption of an impact ranging over 100 G–900 G as a whole.

What is claimed is:

1. An electronic apparatus comprising:
    an enclosure,
    an internal component housed in the enclosure; and
    a shock absorbing member disposed between the internal component and the enclosure and designed to plastically deform in response to an impact.

2. A shock absorbing member for an internal component incorporated in an electronic apparatus, comprising:
    a shock absorbing body designed to plastically deform in response to an impact of a predetermined magnitude;
    a first receiving surface defined at an end of the shock absorbing body so as to receive the internal component; and
    a second receiving surface defined at an other end of the shock absorbing body so as to receive an impact applied from an outside.

3. The shock absorbing member according to claim 2, wherein said shock absorbing body has a sectional area smaller than that of any of the first and second receiving surfaces between the first and second receiving surfaces, said sectional area defined along a plane parallel to the first receiving surface.

4. The shock absorbing member according to claim 3, wherein said shock absorbing body includes:
    a first terminal portion defining said first receiving surface;
    a second terminal portion defining said second receiving surface; and
    a slender stem portion connecting the first and second terminal portions to each other.

5. The shock absorbing member according to claim 4, wherein said slender stem portion is designed to extend along a datum line intersecting at least said first receiving surface by a predetermined angle.

6. The shock absorbing member according to claim 3, wherein said shock absorbing body includes:
    a wedge portion tapered toward either of the first and second receiving surfaces; and
    a wedge receiving portion connected to the wedge portion at an interface so as to receive a tip end of the wedge portion at a plane including the interface.

7. An electronic apparatus comprising:
    an enclosure;
    an internal component housed in the enclosure; and
    a pedestal attached to an exterior of the enclosure; and
    a shock absorbing area defined in the enclosure in a vicinity of the pedestal and designed to plastically deform in response to an impact of a predetermined magnitude.

8. An enclosure for an electronic apparatus, comprising an enclosure body defining:
    a rigid area designed to plastically deform in response to an impact of a first magnitude; and
    a shock absorbing area designed to plastically deform in response to an impact of a second magnitude smaller than the first magnitude.

9. The enclosure according to claim 8, wherein said shock absorbing area is designed to receive a pedestal.

10. An electronic apparatus comprising:
    an enclosure;
    an internal component housed in the enclosure;
    a first elastic member attached to a corner of the enclosure and having a rigidity of a first level; and
    a second elastic member layered over an outer surface of the first elastic member and having a rigidity of a second level smaller than the first level.

11. A shock absorbing member comprising:
    a first elastic member attached to a corner of the enclosure and having a rigidity of a first level; and
    a second elastic member layered over an outer surface of the first elastic member and having a rigidity of a second level smaller than the first level.

12. A shock absorbing member for an internal component incorporated in an electronic apparatus, comprising:
    an attachment member coupled to an enclosure of the electronic apparatus; and
    a contact piece rising from the attachment member so as to receive the internal component, wherein
    a bending portion is defined in the contact piece at least between the enclosure of the electronic apparatus and the internal component.

13. The shock absorbing member according to claim 12, including at least a pair of said contact pieces so as to interpose an occupation space for the internal component therebetween.

14. An electronic apparatus comprising:
    an enclosure;
    an internal component housed in the enclosure;
    an attachment member coupled to the enclosure; and
    at least a pair of contact pieces standing on the attachment member so as to interpose the internal component therebetween, wherein a bending portion is defined in the contact piece at least between the enclosure and the internal component.

15. A shock absorbing member for an internal component incorporated in an electronic apparatus, comprising:

an attachment member coupled to an enclosure of the electronic apparatus; and an elastic piece integral to the attachment member and designed to receive the internal component.

16. An electronic apparatus comprising:

an enclosure;

an internal component housed in the enclosure;

an attachment member coupled to the enclosure; and at least a pair of elastic pieces integral to the attachment member, respectively, and designed to interpose the internal component therebetween.

17. A shock absorbing member for an internal component incorporated in an electronic apparatus, comprising:

an attachment member coupled to an enclosure of the electronic apparatus; and at least a pair of elastic pieces designed to rise from the attachment member so as to interpose the internal component therebetween.

18. A shock absorbing member for an internal component incorporated in an electronic apparatus, comprising:

a connecting member stationarily supported in an inner space defined in an enclosure of the electronic device for receiving the internal component; and a suspended member connected to the connecting member and suspended in a direction of gravity in the inner space.

19. The shock absorbing member according to claim 18, wherein said suspended member is a spherical pendulum.

20. An electronic apparatus comprising:

an enclosure; and an internal component suspended in a direction of gravity within an inner space defined in the enclosure.

21. A shock absorbing member for an internal component incorporated in an electronic apparatus, comprising:

an attachment member attached to an enclosure of the electronic apparatus; and at least a pair of swelling surfaces raised from a surface of the attachment member, respectively, so as to interpose an occupation space for the internal component therebetween, said internal component being allowed to move in a direction tangential to the at least a pair of swelling surfaces.

22. An electronic apparatus comprising:

an enclosure;

an internal component housed in the enclosure;

an attachment member attached to the enclosure; and at least a pair of swelling surfaces raised from a surface of the attachment member, respectively, so as to interpose the internal component therebetween, the swelling surfaces cooperating to restrict movement of the internal component within a plane.

23. An electronic apparatus comprising:

an enclosure;

an internal component housed in the enclosure;

a protrusion attached to one of the enclosure and the internal component;

a receiving member attached to other of the enclosure and the internal component so as to define a void opposed to the protrusion; and a tensioned elastic member extending across a space between the protrusion and the void.

24. A shock absorbing unit comprising:

a contact member designed to define a protrusion;

a receiving member designed to define a void opposed to the protrusion; and a tensioned elastic member extending across a space between the protrusion and the void.

25. An electronic apparatus comprising:

an enclosure having corners on a bottom; and a reinforcing beam extending over the bottom so as to connect opposite corners.

26. An enclosure for an electronic apparatus, comprising a reinforcing beam connecting opposite corners on a bottom.

27. An electronic apparatus comprising:

an enclosure;

a display panel module housed in the enclosure; and a shock absorbing member fixed on an exterior of the enclosure behind the display panel module.

28. An enclosure for a display panel module incorporated in an electronic apparatus, defining an exterior surface designed to receive a shock absorbing member at a backside of the display panel module.

29. The electronic apparatus according to claim 1, wherein contact areas between the shock absorbing member and the internal component and between the shock absorbing member and the enclosure are maintained constant when the shock absorbing member plastically deforms.

* * * * *